United States Patent
Shirai et al.

(10) Patent No.: US 8,212,136 B2
(45) Date of Patent: Jul. 3, 2012

(54) EXERCISE AUDIO REPRODUCING DEVICE, EXERCISE AUDIO REPRODUCING METHOD, AND EXERCISE AUDIO REPRODUCING PROGRAM

(75) Inventors: Katsuya Shirai, Kanagawa (JP); Yuichi Sakai, Kanagawa (JP); Yoichiro Sako, Tokyo (JP); Masamichi Asukai, Kanagawa (JP); Makoto Inoue, Tokyo (JP); Motoyuki Takai, Tokyo (JP); Akane Sano, Tokyo (JP)

(73) Assignee: Sony Corporation, Tokyo (JP)

( * ) Notice: Subject to any disclaimer, the term of this patent is extended or adjusted under 35 U.S.C. 154(b) by 390 days.

(21) Appl. No.: 12/162,053

(22) PCT Filed: Jan. 23, 2007

(86) PCT No.: PCT/JP2007/050990
§ 371 (c)(1),
(2), (4) Date: Jan. 27, 2009

(87) PCT Pub. No.: WO2007/086376
PCT Pub. Date: Aug. 2, 2007

(65) Prior Publication Data
US 2009/0205482 A1     Aug. 20, 2009

(30) Foreign Application Priority Data

Jan. 24, 2006  (JP) .................................. 2006-014565
Jul. 18, 2006  (JP) .................................. 2006-195024

(51) Int. Cl.
*G10H 1/36* (2006.01)
(52) U.S. Cl. ................ 84/612; 84/610; 84/615; 84/634; 84/636
(58) Field of Classification Search ...................... 84/612
See application file for complete search history.

(56) References Cited

U.S. PATENT DOCUMENTS 6,618,336 B2 * 9/2003 Kanou et al. ............... 369/53.34
(Continued)

FOREIGN PATENT DOCUMENTS

JP     6 342282     12/1994
(Continued)

OTHER PUBLICATIONS

Japanese Office Action issued Sep. 6, 2011, in Patent Application No. 2006-195024.

(Continued)

*Primary Examiner* — Elvin G Enad
*Assistant Examiner* — Christopher Uhlir
(74) *Attorney, Agent, or Firm* — Oblon, Spivak, McClelland, Maier & Neustadt, L.L.P.

(57) ABSTRACT

Provided is a device for playing audio with improved convenience, wherein music can be played such that oneness with the actions of the user can be obtained at all times, without giving the user any unnaturalness whatsoever such as unpleasant sensations. After starting playing of music data through such as an audio signal output processing unit 31, action tempo of the user is detected by an exercise information analyzing circuit 23, based on detection output from an exercise information sensor 24, and in the event that the difference between the detected action tempo of the user and the tempo of the music data being played is not a predetermined range, music data with a tempo of which the difference as to the action tempo of the user is within the predetermined range is searched by searching means such as a music playing data generating device unit 22, and a control unit 10 changes the music data to be played so as to play this searched music data.

24 Claims, 20 Drawing Sheets

U.S. PATENT DOCUMENTS

| | | | |
|---|---|---|---|
| 6,805,656 B2 * | 10/2004 | Ogawa | 482/8 |
| 7,518,054 B2 * | 4/2009 | McKinney et al. | 84/612 |
| 7,745,716 B1 * | 6/2010 | Murphy | 84/612 |
| 2004/0116837 A1 | 6/2004 | Yamaguchi et al. | |
| 2005/0219055 A1 * | 10/2005 | Takai et al. | 340/573.1 |

FOREIGN PATENT DOCUMENTS

| | | |
|---|---|---|
| JP | 2001 231904 | 8/2001 |
| JP | 2001 299980 | 10/2001 |
| JP | 2003-036315 | 2/2003 |
| JP | 2003 85888 | 3/2003 |
| JP | 2003-141260 | 5/2003 |
| JP | 2003 177749 | 6/2003 |
| JP | 2003-248724 | 9/2003 |
| JP | 2003 305146 | 10/2003 |
| JP | 2004 16752 | 1/2004 |
| JP | 2004 113552 | 4/2004 |
| JP | 2004 216142 | 8/2004 |
| JP | 2005-038366 | 2/2005 |
| JP | 2005 156641 | 6/2005 |
| JP | 2005-292730 | 10/2005 |
| JP | 2006-301276 | 11/2006 |
| WO | WO 03/005339 A1 | 1/2003 |

OTHER PUBLICATIONS

Japanese Office Action dated Nov. 21, 2011 in Patent Application No. 2006-195024.

* cited by examiner

FIG. 2
A
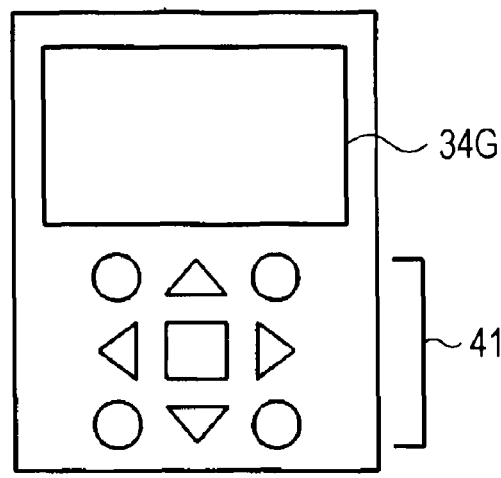
B
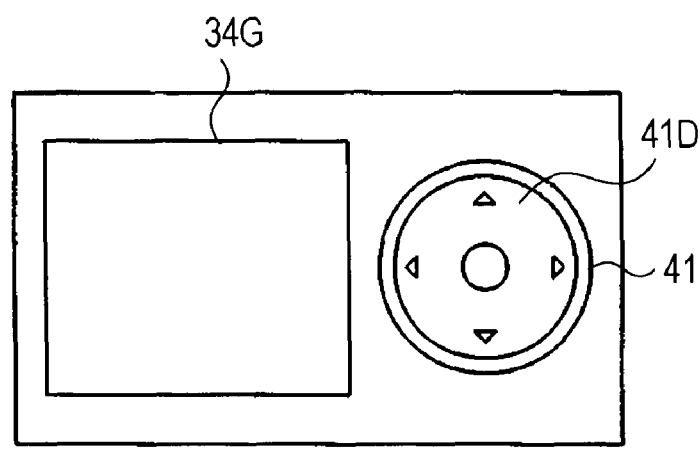
C
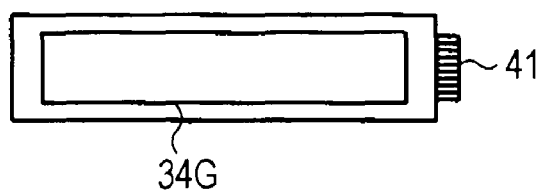

PLEASE INFORM OF YOUR PROFILE

NAME
SEX
AGE [ ] YEARS OLD
HEIGHT [ ] cm
WEIGHT [ ] kg

B 34G

| NAME | ○○○ |
|---|---|
| SEX | Man |
| AGE | 30 YEARS OLD |
| HEIGHT | 170 cm |
| WEIGHT | 60 kg |
| BMI | 20.8 |
| DEGREE OF OBESITY | 1 |

OK? [YES] [NO]

FIG. 5

| TUNE TITLE | TUNE TEMPO | DURATION (PLAYING TIME) |
|---|---|---|
| TUNE A | 125 | 3 MINUTES 30 SECONDS |
| TUNE B | 135 | 2 MINUTES 00 SECONDS |
| TUNE C | 135 | 2 MINUTES 30 SECONDS |
| TUNE D | 150 | 3 MINUTES 20 SECONDS |
| TUNE E | 170 | 3 MINUTES 40 SECONDS |
| ⋮ | ⋮ | ⋮ |

| TUNE TITLE | ○○○ |
| --- | --- |
| ARTIST NAME | △△△ |
| GENRE | ×× × |
| TEMPO | 120 BPM |
| TYPE OF EXERCISE | JOGGING |
| EXERCISE INTENSITY | 5.0 METS |

EXERCISE INFORMATION IS DISPLAYED.

| EXERCISE TIME | 30:00 MINUTES |
| --- | --- |
| DISTANCE WALKED | 3.00 km |
| AVERAGE SPEED | 6.00 km/h |
| OUT-CALORIES | 150 kcal |
| AMOUNT OF FAT BURNED | 19.5 g |

GOOD JOB!

FIG. 8

| TUNE TITLE | TEMPO | PLAYING TIME | TYPE OF EXERCISE | EXERCISE INTENSITY |
|---|---|---|---|---|
| TUNE A | 120 | 3 MINUTES | WALKING | 3.5 METS |
| TUNE B | 135 | 2 MINUTES | WALKING | 5.0 METS |
| TUNE C | 135 | 2 MINUTES | WALKING | 4.0 METS |
| TUNE D | 150 | 5 MINUTES | JOGGING | 5.0 METS |
| TUNE E | 170 | 10 MINUTES | RUNNING | 7.0 METS |
| TUNE F | 165 | 3 MINUTES | JOGGING | 6.5 METS |
| TUNE G | 100 | 5 MINUTES | WALKING | 2.5 METS |

FIG. 9

RUNNING DISTANCE

STRIDE = HEIGHT × 0.45 (WHEN WALKING) ···(1)

STRIDE = HEIGHT × 0.50 (WHEN JOGGING) ···(2)

DISTANCE TRAVELED = STRIDE × STEPS ···(3)

(EXAMPLE) DISTANCE TRAVELED IN A CASE OF A PERSON, 170 cm IN HEIGHT, WALKING FOR 2 MINUTES 30 SECONDS TO A TUNE WITH A TEMPO OF 120

DISTANCE TRAVELED = 170 cm × 0.45 × 120 × (2 × 60 + 30 (SECONDS)) ÷ 60 (SECONDS) = 22950 cm = 229.5 m ···(4)

(EXAMPLE) DISTANCE TRAVELED IN A CASE OF A PERSON, 170 cm IN HEIGHT, RUNNING FOR 2 MINUTES 30 SECONDS TO A TUNE WITH A TEMPO OF 170

DISTANCE TRAVELED = 170 cm × 0.50 × 170 × (2 × 60 + 30 (SECONDS)) ÷ 60 (SECONDS) = 36125 cm = 361.25 m ···(5)

FIG. 10

AVERAGE SPEED

AVERAGE SPEED = WALKING DISTANCE / EXERCISE TIME (TOTAL) ···(6)

(EXAMPLE) AVERAGE SPEED IN A CASE OF MOVING 3 km IN 30 MINUTES

AVERAGE SPEED = 3.00 km / 0.5 (HOURS) = 6.00 km/h ···(7)

FIG. 11

OUT-ENERGY IN 1 MINUTE

Wmin = (35 + SPEED (m/min)) ÷ 2000 × WEIGHT (kg) ···(8)

(EXAMPLE) OUT-CALORIES IN CASE OF 68 kg PERSON WALKING 60 MINUTES AT SPEED OF 100 m/min Wmin = (35 + 100) ÷ 2000 × 68 = 4.59 kcal/min ···(9)
Wtotal = 4.59 kcal / min × 60 min = 275.4 kcal ···(10)

FIG. 12

OUT-ENERGY (CASE OF USING METS VALUE)

OUT-ENERGY (kcal) = WEIGHT (kg) × METS VALUE
    × EXERCISE TIME (TIME) ···(11)

(EXAMPLE) CASE OF A PERSON, 60 kg IN WEIGHT, PERFORMING EXERCISE WITH INTENSITY OF 5 METS FOR 30 MINUTES

OUT-ENERGY = 60 × 5 × 0.5 = 150 kcal ···(12)

METS VALUE WALKING 4 TO 7
    JOGGING 7 TO 15

(EXAMPLE) IF THE USER IN THE CASE OF THE EXAMPLE SHOWN IN FIG. 8 IS 60 kg IN WEIGHT

OUT-ENERGY = 60 × (3 × 3.5 + 2 × 5.0 + 2 × 4.0 + 5 × 5.0
    + 10 × 7.0 + 3 × 6.5 + 5 × 2.5) / 60
    = 155.5 kcal ···(13)

FIG. 13

AMOUNT OF FAT BURNED

CALORIES NECESSARY FOR BURNING 1 kg OF FAT 7700 kcal

AMOUNT OF FAT BURNED = OUT-ENERGY (kcal) ÷ 7700 kcal × 1000 g ···(14)

(EXAMPLE) CASE SHOWN IN FIG. 8
    (CASE THAT OUT-ENERGY IS 155.5 kcal)

AMOUNT OF FAT BURNED DUE TO EXERCISE = 155.5 kcal ÷ 7700 kcal
    × 1000 g = 20.19 g ···(15)

FIG. 14

ABOUT EXERCISE INTENSITY METS (Metabolic Equivalents)

METS = [AMOUNT OF OXYGEN INTAKE WHEN EXERCISING] / [AMOUNT OF OXYGEN INTAKE WHEN AT REST] = (R + H + V) / R ⋯(16)

1 METS IS EQUIVALENT TO OXYGEN CONSUMPTION AMOUNT OF 3.5 ml/kg·min

AMOUNT OF OXYGEN INTAKE WHEN EXERCISING = R + H + V (ml / kg·min) ⋯(17)

R: OXYGEN CONSUMPTION AMOUNT WHEN AT REST 3.5 ml/kg·min

H: HORIZONTAL MOTION COMPONENT 0.1 × SPEED V(m/min) (WALKING) ⋯(18)
        0.2 × SPEED V(m/min) (RUNNING) ⋯(19)

V: VERTICAL MOTION COMPONENT 0.9 × SPEED V(m/min) × INCLINATION rad(%) ⋯(20)

FIG. 15

EXAMPLE) METS VALUE FOR WALKING AT 6 km/h

H: HORIZONTAL COMPONENT = 0.1 × 100 = 10.0 ⋯(21)
    V: VERTICAL COMPONENT = 0.9 × 100 × 0 = 0.0 ⋯(22)

TOTAL = 3.5 + 10.0 + 0.0 = 13.5 ⋯(23)

METS = 13.5 / 3.5 = 3.9 ⋯(24)

EXAMPLE) METS VALUE FOR JOGGING AT 10 km/h

H: HORIZONTAL COMPONENT = 0.2 × 166.7 = 33.34 ⋯(25)
    V: VERTICAL COMPONENT = 0.9 × 166.7 × 0 = 0.0 ⋯(26)

TOTAL = 3.5 + 33.34 = 36.84 ⋯(27)

METS = 36.84 / 3.5 = 10.5 ⋯(28)

FIG. 16

EXAMPLE) IF A PERSON, 60 kg IN WEIGHT RUNS ON FLAT TERRAIN FOR 30 MINUTES AT 10 km/h (166.7 m/min)

$$(3.5 + 166.7 \times 0.2) / 3.5 \times 60 \times 30 / 60 = 315.77 \text{ kcal} \quad \cdots(29)$$

FIG. 17

CALCULATION EXPRESSION
(CASE OF USING METS OF CALCULATING OUT-ENERGY)

SPEED Vi OF 1 EXERCISE ACTION = STRIDE Ww / TIME Ti OF 1 EXERCISE ACTION $\cdots(30)$ OUT-ENERGY = TOTAL OF (WEIGHT Weight (kg) × METS VALUE METS (Vi) OBTAINED FROM SPEED Vi OF 1 EXERCISE ACTION × TIME Ti OF 1 EXERCISE ACTION $\cdots(31)$ $= \sum \text{Weight} \times \text{METS(Vi)} \times \text{Ti} \cdots(32)$

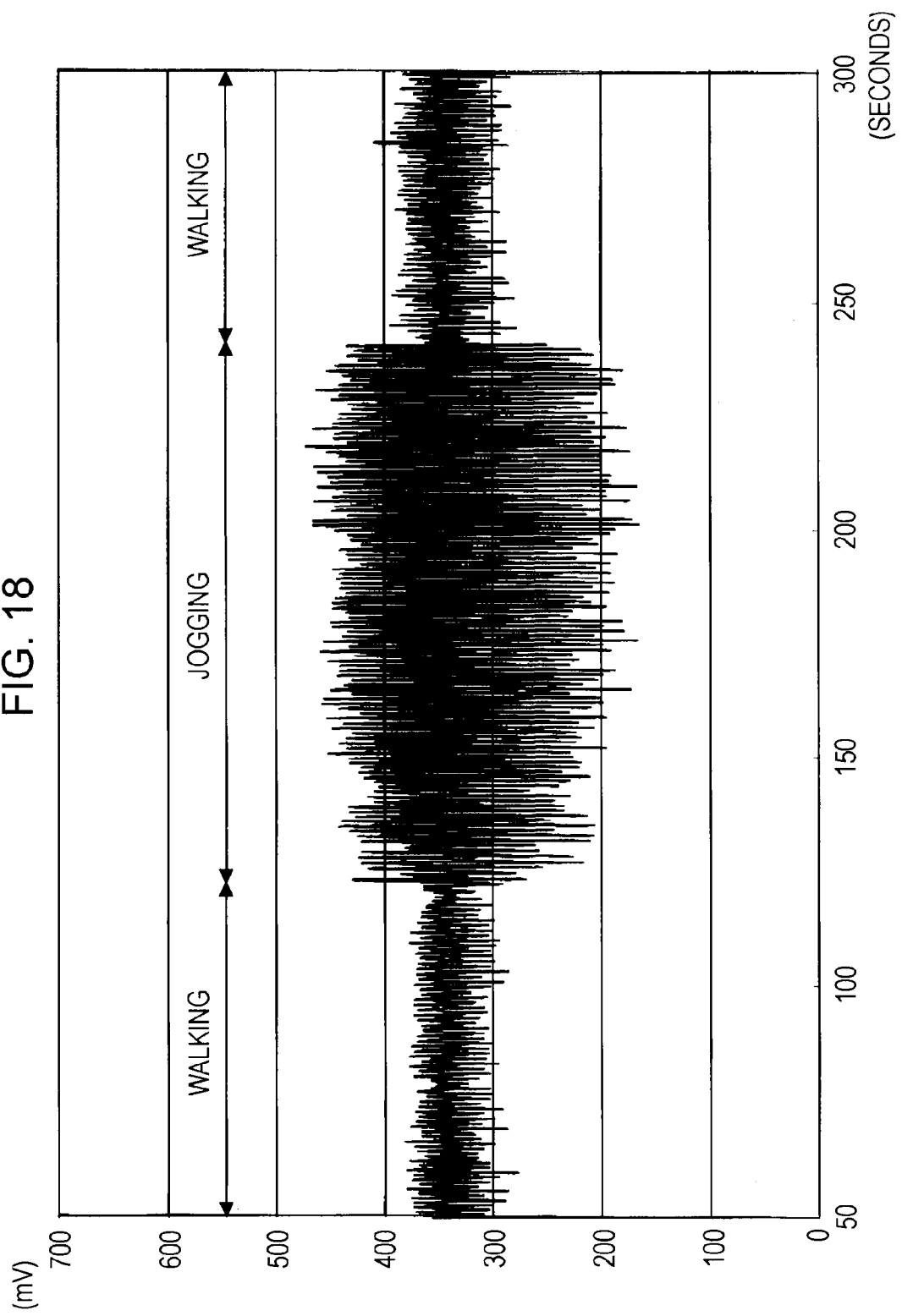

FIG. 21
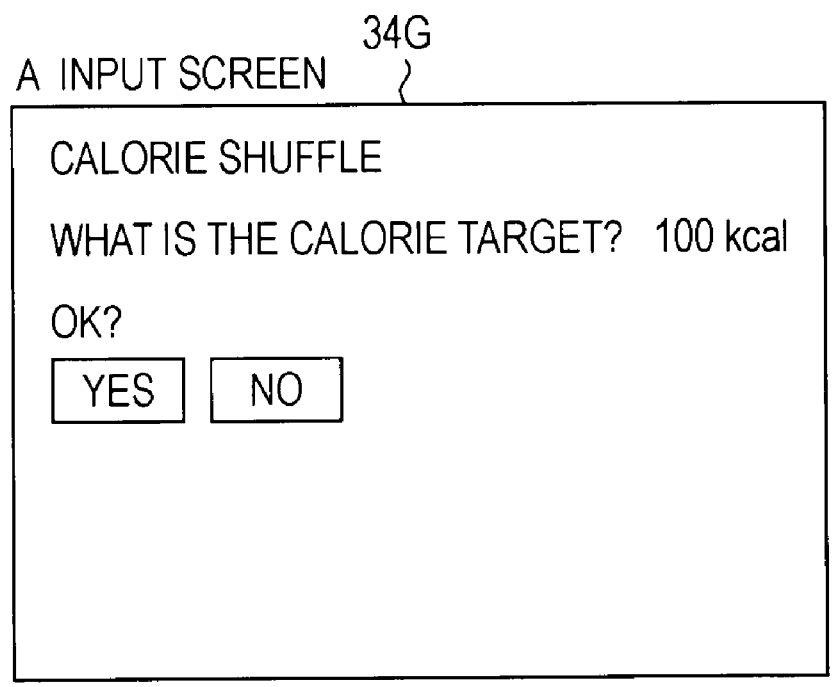
A INPUT SCREEN
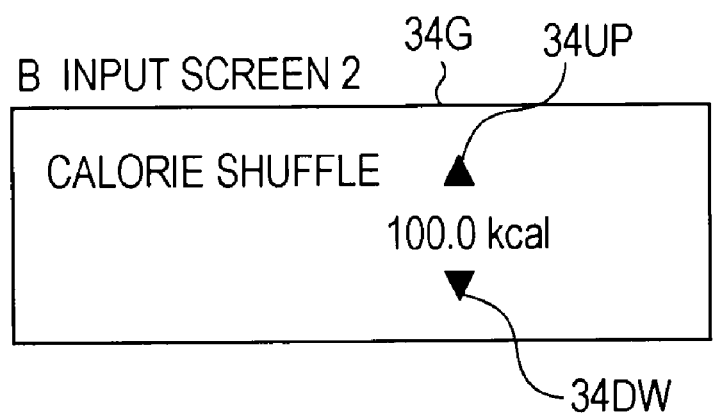
B INPUT SCREEN 2

FIG. 22

A DISPLAY EXAMPLE 1      34G

| TUNE TITLE | ○○○ |
| --- | --- |
| ARTIST NAME | △△△ |
| GENRE | × × × |
| TEMPO | 120 BPM |
| TYPE OF EXERCISE | JOGGING |
| OUT-CALORIES | 10 kcal |
| EXERCISE DISTANCE | 0.5 km |
| NUMBER OF STEPS | 1000 STEPS |

B DISPLAY SCREEN 2      34G

♪ ○○○  (PREDICTION Wolk: 6.2, Jog: 25.0)
☷ △△△
→ 8.9 kcal  (OUT-CALORIES)

FIG. 23
A DISPLAY EXAMPLE 1
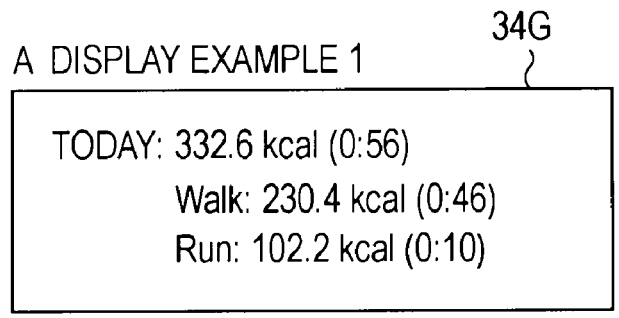
B DISPLAY EXAMPLE 2
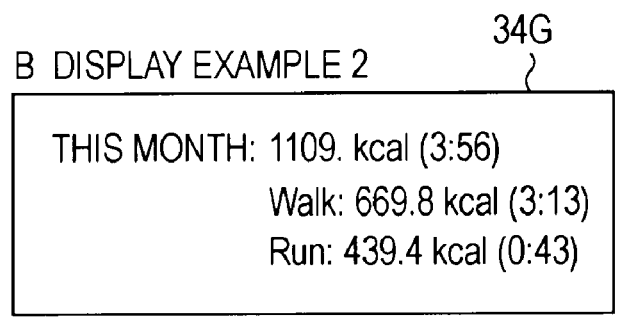
C DISPLAY EXAMPLE 3
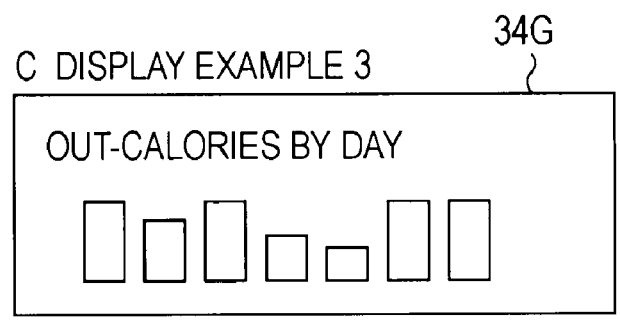
D DISPLAY EXAMPLE 4
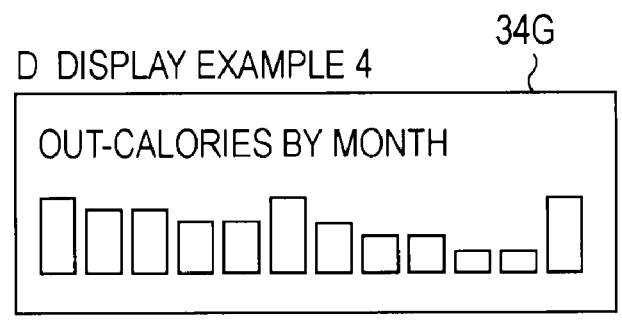

♪ aaaaa  (PREDICTION Wolk: 6.2, Jog: 25.0)
⊗ AAAAA  (PAST AVERAGE: 12.6)
→ 8.9 kcal  (Walk: 3.2, Run: 5.7)

| TUNE | PLAYING TIME | OUT-CALORIES | NUMBER OF STEPS | EXERCISE DISTANCE |
|---|---|---|---|---|
| TUNE A | 2 HOURS 30 MINUTES | 550 kcal | 12000 STEPS | 10.5 km |
| TUNE B | 2 HOURS 10 MINUTES | 500 kcal | 10000 STEPS | 9.5 km |
| TUNE C | 1 HOUR 50 MINUTES | 450 kcal | 8500 STEPS | 8.5 km |
| TUNE D | 1 HOUR 30 MINUTES | 400 kcal | 7500 STEPS | 5.5 km |
| TUNE E | 1 HOUR 10 MINUTES | 350 kcal | 7000 STEPS | 4.5 km |
| TUNE F | 1 HOUR 00 MINUTES | 300 kcal | 6500 STEPS | 4.0 km |

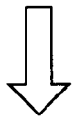

B

- TOP 10 TUNES IN PLAYING TIME
- SELECT TUNES OF 5000 STEPS OR MORE AND SHUFFLE PLAYBACK
- 10 TUNES FROM THOSE WITH FEW OUT-CALORIES
- OTHER

FIG. 26
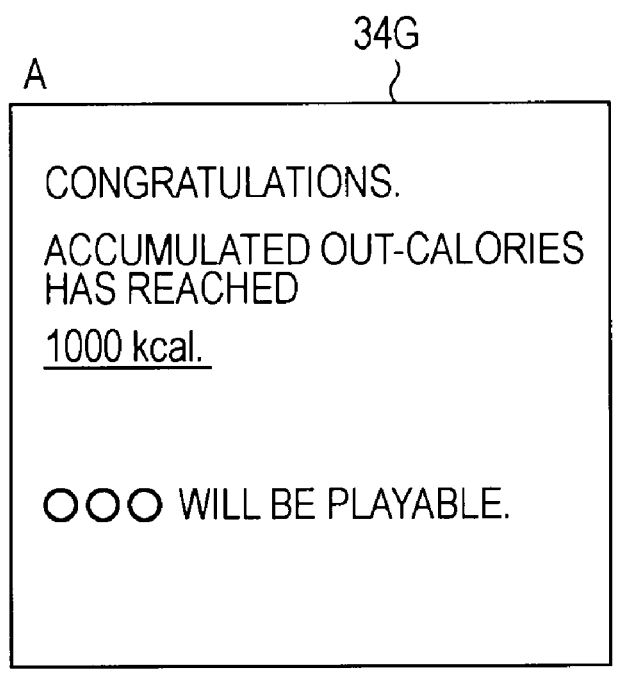
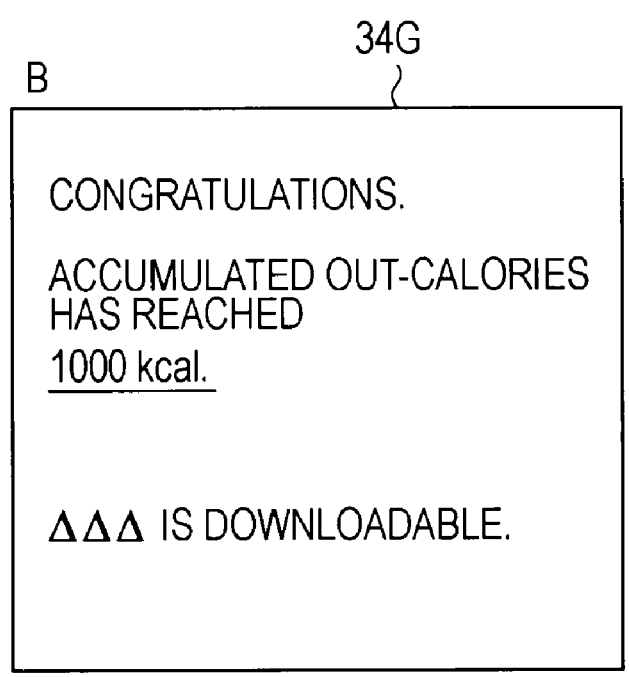

| DESTINATION | DISTANCE FROM NIHONBASHI | TUNE | SECTION | LOCAL PRODUCT | SECTION |
|---|---|---|---|---|---|
| ODAWARA | --- km | TUNE a | ALL | ○○○ | DRAWING |
| HAKONE | --- km | TUNE b | ALL | △△△ | DRAWING |
| NUMAZU | --- km | TUNE c | ALL | □□□ | DRAWING |
| SHIMADA | --- km | TUNE d | ALL | ×× × | ALL |
| HAMAMATSU | --- km | TUNE e | ALL | ○×△ | DRAWING |
| OKAZAKI | --- km | TUNE f | ALL | □△○ | ALL |
| ⋮ | ⋮ | ⋮ | ⋮ | ⋮ | ⋮ |

FIG. 29

| CALCULATION EXAMPLE OF OUT-ENERGY (CASE OF EASILY OBTAINING) |
| --- |
| PRESUME SPEED OR STRIDE. |
| ○ IN THE CASE OF WALKING |
|    Walk: STRIDE PRESUMED (0.7 m) |
|       OUT-CALORIES (kcal) = 0.5 × WEIGHT (kg) × DISTANCE (km) ···(33)<br>                            = 0.00035 × WEIGHT (kg) × NUMBER OF STEPS ···(34) |
|    Walk: SPEED PRESUMED (4 km/h) |
|       OUT-CALORIES (kcal) = 0.5 × WEIGHT (kg) × DISTANCE (km) ···(35)<br>                            = 0.033 × WEIGHT (kg) × TIME (MINUTES) ···(36) |
| ○ IN THE CASE OF JOGGING |
|    Run: STRIDE PRESUMED (0.7 m) |
|       OUT-CALORIES (kcal) = 1.0 × WEIGHT (kg) × DISTANCE (km) ···(37)<br>                            = 0.0007 × WEIGHT (kg) × NUMBER OF STEPS ···(38) |
|    Run: SPEED PRESUMED (8 km/h) |
|       OUT-CALORIES (kcal) = 1.0 × WEIGHT (kg) × DISTANCE (km) ···(39)<br>                            = 0.13 × WEIGHT (kg) × TIME (MINUTES) ···(40) |

EXERCISE AUDIO REPRODUCING DEVICE, EXERCISE AUDIO REPRODUCING METHOD, AND EXERCISE AUDIO REPRODUCING PROGRAM

TECHNICAL FIELD

The present invention relates to a device having a function for playing audio, such as for example, a hard disk player, an MD (Mini Disc (registered trademark)) player, or portable information terminal or the like, with music data playing functions, and a method and program used in a device for playing audio.

BACKGROUND ART

In recent years, as portable audio player which have been reduced in size and reduced in weight have become widespread, music is coming to be listened to in unprecedented situations. For example, portable audio players are being widely taken outdoors to listen to music while walking, or being used to listen to music while performing sports such as jogging, walking, or the like which are performed in order to maintain health, increase health, lose weight, and so forth.

In this case, in the event that the tempo of the music being played and the tempo of the actions (for example, exercise such as walking, jogging, walking, or the like) of the user (hereafter referred to simply as action tempo or exercise tempo) match, a sense of oneness between the actions and the music can be obtained. Accordingly, a device has been conceived in which the action tempo of the user is detected and the tempo of the music being played is changed according to change in the action tempo, even in cases wherein the tempo of the music being played and the action tempo of the user become mismatched, or the action tempo of the user suddenly changes so that a sensation of oneness of the actions and music can be obtained.

Note that in this Description, terms such as tempo of music, playing tempo of music, and tune tempo, mean the speed of music data at the time of being played, and is the number of beats per minute (BPM: Beat Per Minutes). Also, the action tempo (exercise tempo) of the user specifically is the speed of actions, and means the number of increments (single action (exercise)) of smallest measurable actions of the user per minute, such as for example, in the event that the actions (exercise) of the user are walking or running, this is the number of steps per minute, and in the event that the actions are jumping, the number of jumps per minute.

Also, disclosed in Japanese Unexamined Patent Application Publication No. 2005-156641 is a device wherein actions or walking pace are obtained from vibrations accompanying actions or step data from walking, with a detector which the user wears on the body, and the playing tempo of the music is changed in accordance with the change. Using such a device allows exercise to be continued comfortably or exercise to be efficiently performed, along with the music being played, and so forth.

Now, the invention described in the above-described Japanese Unexamined Patent Application Publication No. 2005-156641 is for changing the playing tempo of music being played along with the action tempo of the user, and the playing tempo of the music can be constantly made to follow the action tempo of the user. However, since the playing tempo of the music being played is changed, here are cases wherein music is provided to the user of which the tempo is transient in change from beginning to end. Also, the music to be played is generally pre-composed, so it is conceivable that there may be those thereof which are unsuitable for change in playing tempo.

Also, further increase in convenience for the user is desired, such as not only enabling exercise to be continued in ease, but also enabling support for motivation of exercising and comprehension and management of the amount of exercise, by enabling a oneness to be obtained between the music being played and the actions of the user at the time of performing exercise along with music being played.

Further, with regard to support for motivation of exercising and continuation of exercise, there is new demand for functions enabling support for motivation of exercising and continuation of the exercise not only for 1 exercise session performed in relatively short time increments such as in increments of a few minutes, or increments of several tens of minutes, or increments of several hours at the most, but rather for exercise which is preferably continued over a relatively long period, such as in increments of days, increments of weeks, increments of months, increments of years, and so forth.

In light of the above, a first object of the present invention is to provide a device, method, and program for playing audio with further improved convenience, enabling music to be played such that oneness can be obtained with the actions of the user at all times, without giving any unnaturalness such as unpleasant sensations to the user, and it is a second object of the present invention to provide a device, method, and program for enabling support for motivation for not only 1 exercise session in relatively short time increments but also exercise which is preferably continued over a relatively long period, and for continuing such exercise.

DISCLOSURE OF INVENTION

In order to solve the above problems, an audio player according to the invention in claim 1 is characterized in comprising:

playing means for playing music data;

sensor means for detecting change in actions of a user;

detecting means for detecting an action tempo of the user at each predetermined timing following starting of playing of music data through the playing means, based on detection output from the sensor means;

determining means for determining whether or not the difference between the tempo of music data being played by the playing means and the action tempo of the user detected by the detecting means is within a predetermined range;

searching means for searching, in the event that determination is made by the determining means that the difference between the tempo of music data being played and the action tempo of the user is outside of the predetermined range, for music data of a tempo of which the difference as to the action tempo detected by the detecting means is the predetermined range; and changing means for changing the music data played by the playing means to the music data searched by the searching means.

With the audio player according to the invention in claim 1, following starting playing of music data through the playing means, at each predetermined timing, the action tempo of the user is detected by detecting means, based on detection output from the sensor means, and determination is made by the determining means regarding whether or not the difference between the detected action tempo of the user and the tempo of the music data being played is within a predetermined range.

Then, in the event that determination is made that the difference between the action tempo of the user and the tempo of the music data being played is outside of the predetermined range, the searching means search for music data of a tempo of which the difference as to the action tempo of the user is within the predetermined range, and the music data to be played is changed by the control means such that the searched music data is played.

Accordingly, the music data to be played itself can be changed in accordance with the action tempo of the user, so unlike a case wherein only the tempo is changed without changing the music data being played, music can be played such that oneness with the actions of the user can be obtained, without providing any unnaturalness whatsoever such as unpleasant sensation.

Also, an audio player according to the invention in claim 2 is characterized in comprising:

playing means for playing music data;

sensor means for detecting change in actions of a user;

first detecting means for detecting action tempo of the user before playing of music data through the playing means, based on detection output from the sensor means;

first searching means for searching for music data of a tempo of which the difference as to the action tempo detected by the first detecting means is within a predetermined range;

playing control means for controlling the music data searched by the first searching means so as to be played through the playing means, second detecting means for detecting action tempo of the user at each predetermined timing in the event of playing of music data through the playing means, based on detection output from the sensor means;

determining means for determining whether or not the difference between the tempo of music data being played by the playing means and the action tempo of the user detected by the second detecting means is within the predetermined range;

second searching means for searching, in the event that determination is made by the determining means that the difference between the tempo of music data being played and the action tempo of the user is outside of the predetermined range, for music data of a tempo of which the difference as to the action tempo detected by the second detecting means is within the predetermined range; and changing means for changing the music data played by the playing means to the music data searched by the second searching means.

With this audio player according to the invention in claim 2, before playing the music data through the playing means, first, the action tempo of the user is detected through the first detecting means. Then, music data of a tempo according to the detected action tempo is searched by the first searching means, and here the searched music data is played by the playing means under control of the playing control means.

Subsequently, during the period in which the music data is being played, the action tempo of the user is detected by the second detecting means at each predetermined timing, based on detection output from the sensor means, and determination is made by the determining means regarding whether or not the difference between the action tempo of the user and the tempo of the music data being played is within a predetermined range.

Then, in the event that determination is made that the difference between the action tempo of the user and the tempo of the music data being played is outside of the predetermined range, the second searching means search for music data of a tempo corresponding to the action tempo of the user, and the music data to be played is changed by the changing means such that the searched music data is played.

Accordingly, during the period from the start of playing the music data to ending of playing, the music data to be played itself can be changed in accordance with the action tempo of the user, so unlike a case wherein only the tempo is changed without changing the music data being played, music can be played such that oneness with the actions of the user can be obtained, without providing any unnaturalness whatsoever such as unpleasant sensation.

Also, an audio player according to the invention in claim 13 is characterized in comprising:

profile information accepting means for accepting input of personal profile information from a user;

target exercise amount accepting means for accepting input of target exercise amount of the user;

detecting means of detecting actions of the user;

calculating means for calculating the actual exercise amount of the user, based on the personal profile information of the user accepted through the profile information accepting means, and the detection output from the detecting means;

selecting means for sequentially selecting music data to be played, during a period until an accumulated value of the actual exercise amount of the user calculated at the calculating means reaches the target exercise amount accepted through the target exercise amount accepting means; and playing means for playing the music data selected by the selecting means.

With the audio player according to the invention in claim 13, personal profile information of the user is accepted through the profile information accepting means, and a target exercise amount of the user is accepted through the target exercise amount accepting means. Then, the actual exercise amount of the user is calculated by the calculating means, based on the personal profile information accepted through the profile information accepting means and the actions of the user detected through the detecting means.

Then, during the period until the accumulation value of actual exercise amount calculated by the calculating means reaching the target exercise amount accepted through the target exercise amount accepting means, music data to be played is sequentially selected by the selecting means, and the selected music data is played by the playing means.

Thus, during the period until the exercise amount of exercise performed by the user reaches the input target exercise amount, music data to be played is automatically selected and this can be sequentially played, without troubling the user. Accordingly, music data is consecutively played during the period until the target exercise amount is reached, so motivation can be provided to continue exercise, and continuation of exercise can be supported.

Change in the tempo of actions (Action tempo) of exercise (walking, jogging, running, muscle training, etc.) which the user performs is detected, and tunes (music data) of a tempo corresponding to the action tempo are selected and played, thereby enabling oneness between the actions (exercise) and played tunes to be provided, without causing an unpleasant sensation.

Also, by setting a target exercise amount, or setting a predetermined target exercise amount, and consecutively playing tunes until the exercise amount of the exercise which the user is performing exceeds these, or providing privileges in the case of exceeding, motivation can be provided to continue exercise, and continuation of exercise can be supported. Accordingly, exercise which is preferably continued can be continued.

BRIEF DESCRIPTION OF DRAWINGS

FIG. 2 is a diagram for explaining an example of a representative external view which the audio player can assume.

FIG. 4 is a diagram for explaining an example of an input screen for profile information of a user.

FIG. 5 is a diagram for explaining an example of a tune information list (view list of music data which can be played).

FIG. 6 is a diagram for explaining a display screen example while playing music data.

FIG. 7 is a diagram for explaining a display example of exercise amount information displayed after playing of music data ends.

FIG. 8 is a diagram for explaining an example of a played tune list (play tune history).

FIG. 9 is a diagram for explaining calculation of walking distance and the like.

FIG. 10 is a diagram for explaining calculation of average speed of moving when exercising.

FIG. 11 is a diagram for explaining a case of obtaining out-energy using out-energy per minute.

FIG. 12 is a diagram for explaining a case of obtaining out-energy using METS value which is a value indicating exercise intensity determined for each exercise.

FIG. 13 is a diagram for explaining a case of obtaining the amount of fat burned.

FIG. 14 is a diagram for explaining the METS value.

FIG. 15 is a diagram for explaining the METS value.

FIG. 16 is a diagram for explaining a specific example of a case of obtaining out-calories.

FIG. 17 is a diagram for explaining a specific example of a case of obtaining out-calories.

FIG. 18 is a diagram illustrating vertical direction output of a tri-axial acceleration sensor provided as an exercise information sensor 24.

FIG. 21 is a diagram for explaining an input screen for a target exercise amount.

FIG. 22 is a diagram for explaining a display example of an in-play display for a tune, displayed in a case that music data is being played.

FIG. 23 is a diagram for explaining a specific example of an exercise information display.

FIG. 24 is a diagram for explaining a display example in a case wherein exercise information is to be shown in increments of tunes.

FIG. 25 is a diagram for explaining an example of exercise/played history information.

FIG. 26 is a diagram for explaining a specific example of a case for providing privileges based on exercise history information.

FIG. 29 is a diagram for explaining a calculation example in a case of easily obtaining out-energy of the user.

BEST MODE FOR CARRYING OUT THE INVENTION

An embodiment of the device, method, and program according to the present invention, will be described below, with reference to the drawings. With the embodiment described below, an example will be described wherein of a case wherein the device, method, and program according to the present invention have been applied to, a portable audio player (music player) such as for example, a portable hard disk player, a portable MD (Mini Disc (registered trademark)) player, or cellular telephone terminal with music data (tune data) playing functions, or the like.

[Configuration and Basic Operation of Audio Player]

Figure 1:
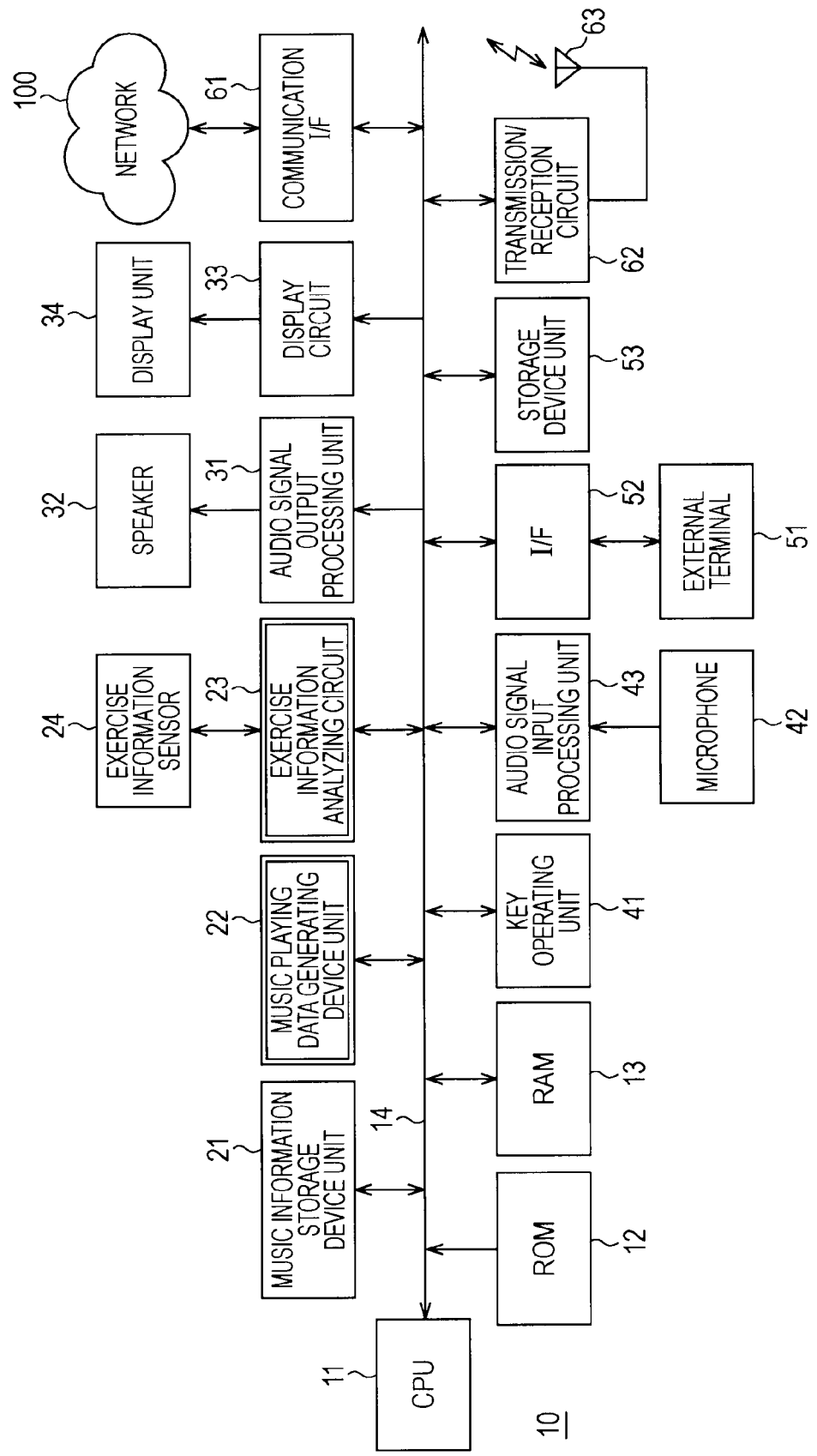
FIG. 1 is a block diagram for explaining an audio player to which an embodiment of a device and method according to the present invention has been applied.

FIG. 1 is a block diagram for explaining the audio player according to the present embodiment. As described above, the audio player according to the present embodiment is portable, reduced in size and reduced in weight, and can be casually used being carried stored in a garment pocket or the like. Accordingly, this is suitable to being used in cases of playing and listening to music while performing various types of exercise, such as walking, jogging, running, and so forth.

As shown in FIG. 1, the audio player according to the present embodiment is provided with a control unit 10, a music information storage device unit 21, a music playing data generating device unit 22, an exercise information analyzing circuit 23, an exercise information sensor 24, an audio signal output processing unit 31, a speaker 32, a display circuit 33, a display unit 34, a key operating unit 41, a microphone (shown as a mike in FIG. 1) 42, an audio signal input processing unit 43, an external terminal 51, an I/F (interface) 52, a storage device unit 53, a communication I/F 61, a transmission/reception circuit 62, and a transmission/reception antenna 63.

The control unit 10 is for controlling each unit of the audio player, and is configured with a CPU (Central Processing Unit) 11, ROM (Read Only Memory) 12, and RAM (Random Access Memory) 13 connected via a CPU bus 14. Here, the CPU 11 is capable of executing programs and supplying control signals generated thereby to each component, thereby controlling each component, and is the primary entity of control. The ROM 12 is for storing and holding various types of programs to be executed by the CPU 11 and various types of data necessary for processing, and so forth. Also, the RAM 13 is used primarily as a work region (work area), such as temporarily storing midway results of processing, and so forth.

The music information storage device unit 21 is a device portion for reading out music data recorded in recording media, and writing music data to the recording media. There are various types of recording media, such as hard disks, magneto-optical discs such as MD (Mini Disc (registered trademark)), optical discs such as CD (Compact Disc) and DVD (Digital Versatile Disc) and so forth, semiconductor memory, IC card memory formed using semiconductor memory, magnetic tape, and so forth, and in the case that the recording medium is a hard disk for example, the music information storage device unit 21 corresponds to a hard disk drive, and in the event that the recording medium is an optical disc, the music information storage device unit 21 corresponds to an optical disc drive.

The music playing data generating device unit 22 is for performing various types of processing regarding music data (tune data) to be played, in response to control from the control unit 10. Though specifically described later, this is a portion for performing processing such as selecting music data to be played from multiple music data stored in the music information storage device unit 21, determining the playing order of the music data to be played, and so forth.

The exercise information analyzing circuit 23 is a portion which performs analysis processing and the like relating to exercise of the user, in response to control from the control unit 10 and the like. Though described later, the exercise information analyzing circuit 23 calculates how much the exercise amount will be in the event that the user performs a predetermined exercise along with music provided by playing the music data, based on personal profile information such as the height, weight, sex, and so forth of the user, which is input via the key operating unit 41, and the properties information of the played music data, such as play time, tempo, and so forth.

Also, in the event that a target exercise amount is input via the key operating unit 41, the exercise information analyzing circuit 23 also has a function to calculate the exercise intensity, exercise time (time over which the exercise is to be continued), and so forth, in the case of performing exercise of the input exercise amount. Also, the exercise information analyzing circuit 23 can calculate the actual exercise amount of the user by receiving supply of detection output from the exercise information sensor 24.

Note that in FIG. 1, functions of the music playing data generating device unit 22 and the exercise information analyzing circuit 23 indicated by double-line blocks can also be realized by a program executed at the control unit 10. Accordingly, the functions of the music playing data generating device unit 22 and the exercise information analyzing circuit 23 can also be realized by the control unit 10 functioning.

The exercise information sensor 24 can, in the event that the user is exercising, detect this, or detect change in the body temperature of the user or change in the pulse, and so forth, using one or more of various types of sensors, such as an acceleration sensor, shock sensor, pressure sensor, charge potential sensor, distortion sensor, ranging sensor, current sensor, temperature sensor, or the like. As described above as well, these detection outputs are supplied to the exercise information analyzing circuit 23, and will be used for calculation of actual exercise amount and so forth.

With the present embodiment, a tri-axial acceleration sensor, for example, is used as the exercise information sensor 24, arranged such that the action tempo (tempo of actions) such as walking and jogging and the like can be detected by analyzing the detection output from this acceleration sensor. Also, the arrangement is such that detection can be made regarding the type of exercise being performed, such as whether the exercise that the user is performing is walking or jogging, by analyzing the detection output from the acceleration sensor used as the exercise information sensor 24.

With the audio player according to the present embodiment, the audio signal output processing unit 31 receives supply of audio data (digital data) to be played which is supplied via the control unit 10, performs D/A (Digital Analog) conversion thereof and the like, and forms analog audio signals for output. The analog audio signals from the audio signal output processing unit 31 is supplied to the speaker 32, and audio corresponding to the analog audio signals supplied thereto is output from the speaker 32.

Now, though not shown in the drawings, the audio signal output processing unit 31 is configured such that an audio output terminal is connected thereto, and in the event that a headphone or earphone is connected thereto, the analog audio analog signals from the audio signal output processing unit 31 are supplied through the audio signal output terminal to the headphone or earphone connected thereto, so that the played audio can also be listened to thorough the headphone or earphone. Thus, in the event that a headphone or earphone is connected to the audio output terminal, the played audio is not output from the speaker 32.

The display circuit 33 is for forming an image to be displayed on the display screen of the display unit 34, in response to control from the control unit 10. In this case, a display device such as, for example, an LCD (Liquid Crystal Display) or EL (Electro Luminescence) panel or the like is used for the display unit 34, and has a relatively large display screen, and is such that can display various types of information. Operating guidance, error messages, titles of played music, and other various types of text information, image information, and so forth, are displayed on the display screen of the display unit 34, in response to control of the control unit 10.

The key operating unit 41 has multiple operating keys and function keys, and is a portion for accepting input of instructions and information and so forth to be provided to the audio player, such as starting or ending of music playing, selection of music to be played, personal profile information, target exercise amount, and so forth. Also, the microphone 42 picks up audio and converts this into electric signals so as to be taken in. Analog audio signals in accordance with the audio picked up by the microphone 42 are supplied to the audio signal input processing unit 43, and here are subjected to A/D (Analog/Digital) conversion and the like, and can be recorded in a recording medium of the music information storage device unit 21 via the control unit 10.

The external terminal (external input/output terminal) 51 is a connection terminal with external equipment, and is arranged to be capable of receiving supply of audio data from another audio player and taking this in, or conversely supplying music data from the audio player according to the present embodiment to other external equipment, for example. Also, besides music data, programs and various types of data can also be input/output.

Note that the I/F 52 is for performing processing such as taking in data regarding which supply has been received via the external terminal into the audio player according to the present embodiment, and converting this into data of a format which can be processed, or conversely converting from data to be output to other equipment into data of an outputtable format.

Though described later, the storage device unit 53 can store and hold data to be saved, for example, various types of information such as identification information of audio data that has been played, properties information of that audio data, personal profile information of the user, calculated exercise amount information, and so forth. Also, music data can be stored in this storage device unit 53, as a matter of course.

Note that the storage device unit 53 is a storage portion for performing processing of reading out various types of data recorded in a recording medium, and writing various types of data to the recording medium, as with the above-described music information storage device unit 21. There are various types of recording media, such as hard disks, magneto-optical discs such as MD (Mini Disc (registered trademark)), optical discs such as CD (Compact Disc) and DVD (Digital Versatile Disc) or the like, semiconductor memory, IC card memory formed using semiconductor memory, magnetic tape, and so forth, and in the case that the recording medium is a hard disk for example, the storage device unit 53 corresponds to a hard disk driver, and in the event that the recording medium is an optical disc, the storage device unit 53 corresponds to an optical disc driver.

Also, the audio player according to the present embodiment has the communication I/F (interface) 61, and is arranged so as to be capable of connecting to a network 100 such as the Internet or the like, and transmitting/receiving intended music data, properties information of the music data, and so forth, for example. Also, this is arranged such that music data, properties information of the music data, and so forth, can be obtained, by connecting to a wireless LAN (Local Area Network) or the like via the transmission/reception circuit 62 or transmission/reception antenna 63, for example.

The control unit 10 then controls each portion in accordance with the input of instructions from the user accepted via the key operating unit 41, and can record music data of which supply is received via the communication I/F 61, or the external terminal 51 and I/F 51, or via the transmission/reception circuit 62 and transmission/reception antenna 63, or the properties information such as total play time, tempo, genre, melody, and so forth, of the music data, in the recording medium of the music information storage device unit 21 via the control unit 10.

In a normal case then, a list of music (tunes) stored and held as music data in the music information storage device unit 21 is compiled by the control unit 10, and this is displayed on the display screen of the display unit 34 via the display circuit 33, and by selecting music data to be played from the list display of music that is displayed by way of the key operating unit 41, that music data can be played.

In this case, the control unit 10 reads out the intended music data from the music information storage device unit 21 in response to a playing instruction accepted by the key operating unit 41 including music data selection information, and supplies this to the audio signal output processing unit 31. Upon audio data being thus supplied to the audio signal output processing unit 31, output analog audio signals are formed as described above, the intended music data is played via the speaker 32 or headphone or earphone connected to the unshown external output terminal, whereby the music being output can be listened to.

With the audio player according to the present embodiment, in a case of playing music data, the action tempo of the user is detected for each predetermined timing by the functions of the exercise information sensor 24 and the exercise information analyzing circuit 23, enabling the music data to be played to be changed to music data of a tempo corresponding to the action tempo of the user, which will be described in further detail later.

Thus, by changing the music data to be played to music data of a tempo corresponding to the action tempo of the user, instead of changing the playing tempo of the music data be played, music data corresponding to the action tempo of the user can be played without creating unpleasant sensations, the user performing exercise can feel oneness with the music data being played, and exercise can be continued comfortably and moreover efficiently.

Further with the audio player of the present embodiment, in the event that music data is played in a case that personal profile information such as the weight, height, sex, age, etc., of the user has been input by way of the key operating unit 41, the exercise amount in a case of performing predetermined exercise such as walking or jogging or the like in concert with the music corresponding to the music data is calculated by the exercise information analyzing circuit 23, based on the personal profile information and the properties information of play time and tempo and the like of the played music data. At the time of ending playing of the music data or so forth, the calculated exercise amount information can be displayed on the display unit 34 via the display circuit 33, and thus be provided to the user.

Thus, by easily and accurately calculating the amount of exercise which the user has performed and enabling this to be presented to the user, motivation for continuing exercise, such as performing how much exercise while listening to music results in how much exercise amount, and how much exercise should be performed, and so forth, can be clearly given.

Also, in the case of the audio player according to the present embodiment, the exercise information sensor 24 is provided, and in the event that the fact that the user has exercised has been detected by this exercise information sensor 24, the detection output is supplied to the exercise information analyzing circuit 23, and the actual exercise amount of the user can be calculated. This actual exercise amount can also be provided to the user by displaying on the display screen of the display unit 34.

Further, as another function, in the event that a target exercise amount has been input via the key operating unit 41, the necessary exercise time and exercise intensity and so forth are calculated by the functions of the exercise information analyzing circuit 23, and based on the results thereof, the music playing data generating device unit 22 selects the music data to be played, from the music data stored and held in the music information storage device unit 21.

The playing tempo of the selected music data, the combination of music data to be played (play order), the number of times of play repetition of each music data, and so forth, are determined, the music data is played exactly as determined thusly, and by exercising in concert with the music being played, exercise of the target exercise amount can be performed comfortably.

Also, as another function, in the event that a target exercise amount is input via the key operating unit, music data to be played can be automatically selected until the input target exercise amount is reached. Specifically, a calorie-shuffle function is provided which automatically selects and plays music data to be played, in the event that a target of out-calories (goal out-calories) are input for example, until the user performs exercise equivalent to the goal out-calories, which will be described later.

Now, the calculation of exercise amount to be accumulated in this case basically uses the exercise amount calculated based on the detection output from the exercise information sensor 24. That is to say, as described above as well, the exercise amount calculated based on the detection output from the exercise information sensor 24, personal profile information that has been input, and attribute information such as the play time of played music data, tempo, and so forth, at the exercise information analyzing circuit 23, is used.

Also, in the event that exercise has been performed, one or more of the information of identification information such as the title name of music data that has been played, play time, the number of times of playing, personal profile information, exercise amount information, and so forth, is stored and held in the storage device unit 53 as history information, whereby the stored and held information can be analyzed after the exercise has ended. For example, storing the exercise amount information in the storage device unit 53 enables information to be obtained such as how much exercise was performed every day, how much is the total of the exercise amount, and so forth.

Also, by providing entertainment such as providing privileges in the event of reaching a predetermined value for exercise amount, based on the history information such as the exercise amount information arranged to be stored and held in the storage device unit 53, motivation for performing exercise regarding which continuing over a long period is desired, support for continuation of the exercise, and also management of the exercise amount, can be performed.

[About the External Appearance of the Audio Player]

Next, a representative example of an external appearance which the audio player according to the present embodiment can assume will be described. FIG. 2 is a diagram for explaining a representative example of an external appearance which the audio player according to the present embodiment can assume. The size of the external appearance which the audio player according to the present embodiment can assume is within around a size which can fit into a breast pocket of the user, and is a size within around a size which can fit into the palm of the hand of the user.

Accordingly, the size of the audio player according to the present embodiment will be at the largest, around a size which can fit into a breast pocket of the user, as shown in A in FIG. 2 and B in FIG. 2, and in a small case will be around several sticks of chewing gum, stacked, formed in plate form, or slightly larger, as shown in C in FIG. 2. Of course, there is the possibility of further reduction in size, reduction in thickness, and reduction in weight, due to advance in technology.

Now, A in FIG. 2 and B in FIG. 2 each show the external appearance of the audio player according to the present embodiment in a case of being configured to be around a size which can fit into a breast pocket of the user, and an erected type used with the longitudinal direction of the audio player being the vertical direction as to the user as shown in A in FIG. 2, and a sideways type used with the longitudinal direction of the audio player being the horizontal direction as to the user as shown in B in FIG. 2, can be conceived.

Now, as shown in A in FIG. 2 and B in FIG. 2, the face of the audio player facing the user (front face) has provided thereto a display screen of a display unit such as an LCD, and a key operating unit. As shown in A in FIG. 2, in the case of an erected type audio player, the key operating unit 41 is provided on the lower side portion of a display screen 34G. Of course, the positional relation between the display screen 34G and the key operating unit 41 can be inverted from that shown in A in FIG. 2. Also, in the case of an erected type audio player, the display screen 34G may be positioned at the center portion of the front face of the audio player, with the key operating unit 41 disposed divided into two portions, the upper side portion thereof and the lower side portion thereof.

Also, as shown in B in FIG. 2 in the case of a sideways type audio player, the key operating unit 41 is provided to the side of the display screen 34G. Of course, the positional relation between the display screen 34G and the key operating unit 41 can be inverted. That is to say, if one of the display screen 34G and the key operating unit 41 is disposed to the right side, the other will be disposed to the left side. Also, in the case of a sideways type audio player, the display screen 34G may be positioned at the center portion of the front face of the audio player, with the key operating unit 41 disposed divided into two portions, the right side portion thereof and the left side portion thereof.

Also, as for the key operating unit 41, this may be configured only of so-called "button keys" capable of pressing operations, as shown in A in FIG. 2, or configured also with a dial having a dial portion 41D, capable of an operation of tracing over the dial portion 41D with the finger or the like, and an operation of pressing a predetermined position on the dial portion 41D, as shown in B in FIG. 2. Note that the dial portion 41D may be arranged such that mechanical turning operations can be performed of the dial portion 41D itself.

Also, in the case of an extremely small sized configuration as shown in C in FIG. 2, the key operating unit 41 cannot be provided on the front face of the audio player as shown in A in FIG. 2 and B in FIG. 2, so an arrangement may be made wherein, as shown in C in FIG. 2, a dial capable of turning operations is provided as the key operating unit 41 on the side face portion of the audio player.

Also, as for the key operating unit 41, a so-called jog dial capable of turning operations and pressing operations, or an operating lever called a so-called joystick, or the like, may be used. Also, in the event that the audio player is such as shown in A in FIG. 2 and B in FIG. 2 wherein the display screen 34G of the display unit has a relatively large display region, a touch panel may be adhered to the display screen 34G, with the key operating unit 41 being configured of the information displayed on the display screen 34G and the touch panel.

Now, providing various types of key operating units described with reference to FIG. 2 enables input of various types of information, such as input of text like the name of the user and so forth, various types of numerals and symbols and so forth, moving of a cursor, selection of items, and so on. In the case of text input for example, assigning characters for each button key enables input of text with a small number of button keys. Also, in the case of using a dial key, tracing operations of the dial portion or turning operations of the dial portion enables selection of characters, and taking a pressing operation of a predetermined button key or a pressing operation of the dial portion, as a determining operation, enables input of characters.

Note that that shown in FIG. 2 is an illustration of configuration examples of external views and operating units. Accordingly, various types of sizes and shapes can be conceived for the audio player, other than those shown in FIG. 2. Also, the key operating unit is also not restricted to that shown in FIG. 2. For example, in the case of the examples shown in A in FIG. 2 and B in FIG. 2, a dial or jog dial, or button keys or the like may be further provided to the side face portion. That is to say, as for the key operating unit, this may be configured combining various types of operating units, such as button keys, dials, job dials, touch panels, joysticks, slide-type operating switches, and so forth.

[About the Operations of the Audio Player in the Case of Changing Tunes to be Played in Accordance with Action Tempo (Music Playing Method)]

Next, operations in the case of changing the tune to be played in accordance with the action tempo of the user with the audio player according to the present embodiment will be described with reference to the flowchart in FIG. 3. Note that the operations of the audio player according to the present embodiment will be described as necessary, making reference to an example of information displayed on the screen 34G of the display unit 34 shown in FIG. 4 through FIG. 8, and tune information indicating tunes which can be played, and an example of a played tune list which is history of played tunes.

Figure 3:
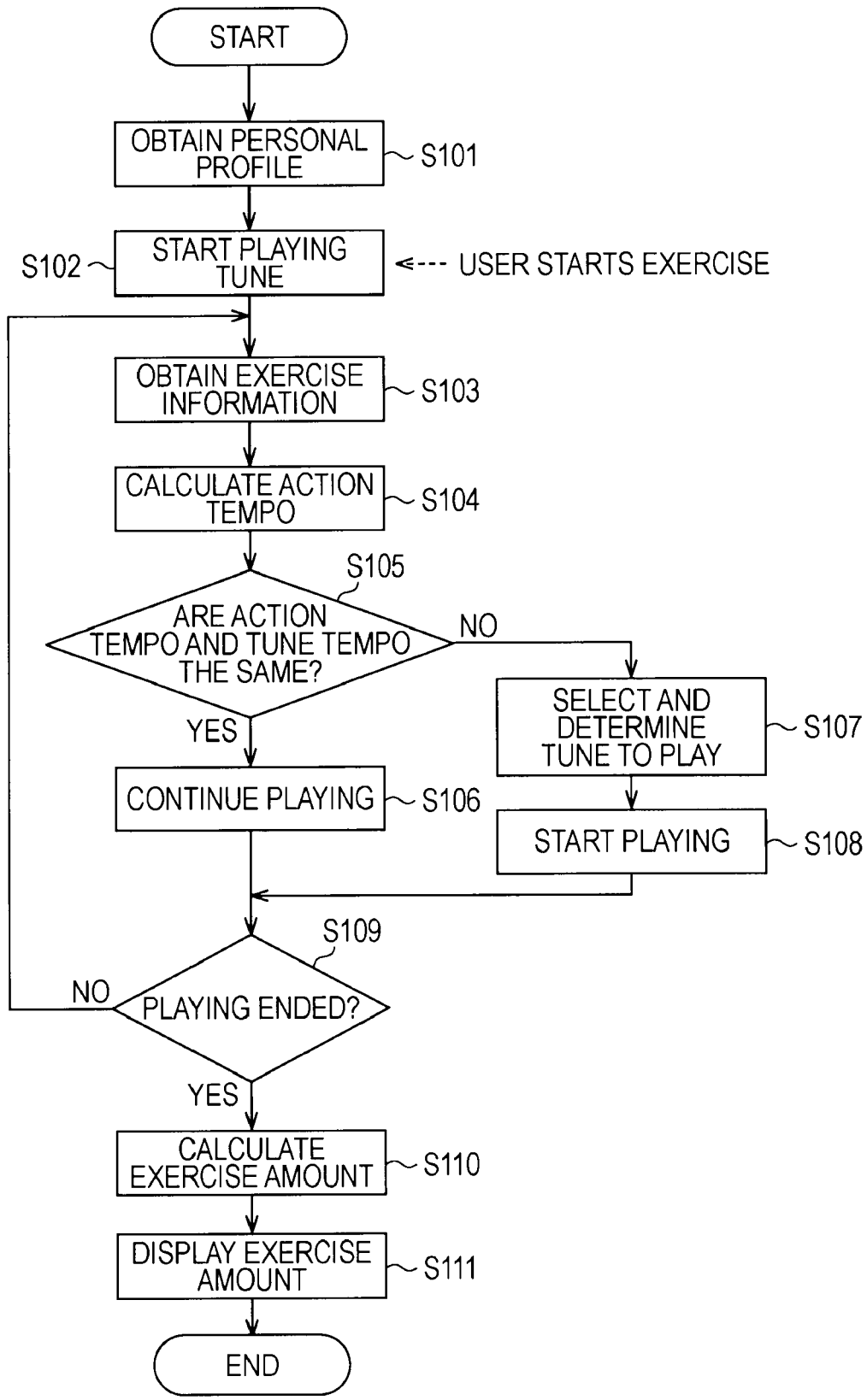
FIG. 3 is a flowchart for explaining operations of the audio player shown in FIG. 1.

FIG. 3 is a flowchart for explaining the operations with the audio player according to the present embodiment in a case of changing the tune to be played in accordance with the action tempo of the user. With the audio player according to the present embodiment, in the event that music data is being played, the action tempo of the user is detected at each predetermined timing, and in the event that difference between the tempo of the music data being played and the action tempo of the user is out of a predetermined range, change can be made to music data of a tempo of which the difference as to the action tempo of the user is within the predetermined range, as explained below in detail.

Upon the user of the audio player, who is to perform exercise such as walking or jogging or the like while listening to the music provided by playing the music data by way of the audio player according to the present embodiment, turning on the power of the audio player, the control unit 10 of the audio player according to the present embodiment executes the processing shown in FIG. 3, accepts input of personal profile information from the user, and obtains this (Step S101).

In this step S101, an input screen for personal profile information such as shown in A in FIG. 4 for example is displayed, and input from the user is accepted via the key operating unit 41. In the case of this example, input of personal profile information which is necessary for calculating the exercise amount of the user, such as the name, sex, age, height, weight, and so forth, of the user, is accepted, as shown in A in FIG. 4.

Upon accepting input of the personal profile information, as shown in B in FIG. 4 for example, the control unit 10 displays on the screen 34G of the display unit 34 a confirmation screen made up of the name, sex, age, height, weight, of the user, and BMI (Body Mass Index: a body volume index obtained by weight (kilograms)÷height (meters) to the second power) and degree of obesity calculated from the accepted height and weight, with confirmation input being requested, and in the event of not being correct, this can also return to the input screen shown in A in FIG. 4 and correction input be performed. Note that in FIG. 3, the processing of step S101 is shown including such correction processing of the personal profile information.

Next, the control unit 10 of the audio player according to the present embodiment starts playing of arbitrary music data (step S102). Here, arbitrary music data may be any of, for example, music data which the user has specified, randomly-selected music data, or music data selected according to a certain rule.

Specifically, a great number of music data playable with this audio player is stored in the recording medium of the music information storage device unit 21 of the audio player according to the present embodiment, and is managed by a tune information list (view list of playable music data) made up of the tune title (title), tune tempo, length of tune (play time of entire tune), and so forth, for example, as shown in FIG. 5.

Accordingly, in the tune playing start step of step S102, if an arrangement is made to play music data selected by the user from the tune information list shown in FIG. 5, or to play music data randomly selected from the tune information list shown in FIG. 5 using predetermined random numbers, or to update the number of plays of each tune in the tune information list shown in FIG. 5, those with high usage frequency can be played with priority, or conversely, those with low usage frequency can be played with priority.

Note that here, while a case of playing music data stored and held in the storage medium of the music information storage device unit 21 of the audio player according to the present embodiment has been explained as an example, this is not restrictive. While explained above as well, an arrangement may be made wherein the network 100 is connected to via the communication I/F 61, intended music data from a provider server of music data existing on this network 100 is downloaded, and this is played.

Also, in the processing in step S102, information regarding the music data being played, such as the tune title, artist name, genre, tempo, and so forth, of the music data being played, is displayed on the display screen 34G of the display unit 34 as shown in FIG. 6 for example, such that the user can be notified thereof. Note that in the present embodiment, information such as the artist name or genre or the like does not exist in the tune information list shown in FIG. 5, these information can be obtained from a music database of a server device on the network based on identification information of the music data such as the tune title, or the tune information list shown in FIG. 5 may be provided with the information such as the artist name or genre or the like, with this to be used, for example.

Note that the type of exercise and intensity of exercise are calculated by processing of the later-explained step S104, for example. Accordingly, with the audio player according to the present embodiment, the type of exercise and intensity of exercise are not displayed yet in the processing in step S102.

The control unit 10 of the audio player according to the present embodiment controls the exercise information analyzing circuit 23 such that the exercise information analyzing circuit 23 obtains exercise information (sensor detection output) of the user via the exercise information sensor (acceleration sensor) 24 (step S103), and the exercise information analyzing circuit 23 analyzes this, thereby calculating the action tempo and the like of the user (step S104).

As explained above, the exercise information sensor 24 according to the present embodiment is configured of a tri-axial acceleration sensor, with the exercise information analyzing circuit 23 detecting the cycle of peak values of the detection output (detection waveform) from the exercise information sensor 24, detecting periodicity by calculating autocorrelation of detection output, or performing frequency spectrum analysis to detect the periodicity thereof, thereby detecting the action tempo of the user. Of course, other methods may be used to detect the action tempo of the user.

Also, with the present embodiment, a tri-axial acceleration sensor is used as the exercise information sensor 24, whereby the type of exercise which the user is performing can be distinguished, such as whether walking, jogging, or the like, for example, based on the magnitude of the vertical direction acceleration component. That is to say, while explained later in detail, it is known that between walking and jogging, the magnitude of shock is two times to three times greater with jogging. This is used to distinguish at least whether the exercise which the user is performing is walking or jogging, based on the magnitude of vertical direction amplitude of the detection output from the acceleration sensor.

Further, with the audio player according to the present embodiment, in the processing in step S104 a METS (Metabolic Equivalents) value is obtained as information indicating the intensity of exercise which the user is performing, based on the calculated action tempo and exercise type. While calculation of this METS value will be explained later in detail, this is a value calculated by dividing the oxygen intake amount when exercising obtained from horizontal movement component and vertical movement component, by the oxygen consumption amount when resting which is obtained beforehand.

Then, after calculating action tempo and so forth of the user, the control unit 10 of the audio player determines whether or not the calculated action tempo of the user and the tune tempo of the music data being played (tune tempo) are the same (step S105). Here, as shown in FIG. 5, the tune tempo can be known by referring to the tempo of the music data being played from the tune information list.

And so forth, in step S105, whether or not the action tempo of the user and the tempo of the music data being played are the same, but it is thought that in reality, completely matching would be a rarity, so determination is made regarding whether or not the difference between the action tempo of the user and the tempo of the music data being played is within a predetermined range. In the event that the difference between the action tempo of the user and the tempo of the music data being played is within a range of ±5 for example, determination is made that the action tempo of the user and the tempo of the music data being played are the same.

In this way, with the present embodiment, the "predetermined range" in the case of the difference between the action tempo of the user and the tempo of the music data being played being within the predetermined range is determined beforehand, and is arranged to be changeable by the user. For example, this is set such that the difference as to the action tempo of the user is within ±5 or the like, as explained above.

Of course, since the "predetermined range" is determined beforehand as explained above, it is needless to say that an arrangement may be made wherein determination is made that the action tempo of the user and the tempo of the music data being played are the same only in a case wherein the difference is "0" (a case of completely matching), or a suitable range may be set, such as a case where the difference is ±1, the difference is ±2, . . . , and so on.

Upon determining in the determination processing in step S105 that the action tempo of the user and the tempo of the music data currently being played are the same, the control unit 10 of the audio player according to the present embodiment continues playing of the music data currently being played with no change (step S106). Note that in the processing in this step S106, processing for displaying the information indicating the type of exercise and the intensity of exercise calculated in step S104 is also performed so as to be displayed as with the playing display example shown in FIG. 6.

On the other hand, in the event that determination is made in the determination processing in step S105 that the action tempo of the user and the tempo of the music data currently being played are not the same, the control unit 10 of the audio player selects and determines music data of a tempo from the tune information list shown in FIG. 5 for example such that the difference as to the action tempo of the user is within the predetermined range (step S107), and starts playing of the music data determined in this step S107 (Step S108).

In this step S108, the tune title, artist name, genre, tempo, type of exercise, and type of exercise are displayed regarding the music data for which playing has been newly started, with the playing display example shown in FIG. 6. Note that the tune title and tempo are obtainable from the tune information list shown in FIG. 5, the artist name and genre are obtained from a music database in a server on the network, and the type of exercise and intensity of exercise are calculated in the processing in step S104.

Also, in step S108, processing for updating played music data (played music history) such as shown in FIG. 8 is also performed. That is to say, in the event of changing music data to be played corresponding to the action tempo of the user, the control unit 10 adds to and records history information made up of the tune title, tempo (tune tempo), play time, type of exercise, and intensity of exercise, of the music data which had been played up to then, for example, in played music data (played music history) compiled at the music information storage device unit 21 or storage device unit 53.

Now, the tune title and tune tempo are obtained from the tune information list shown in FIG. 5, and the type of exercise and intensity of exercise used are those calculated in step S104, and these information are correlated as history information and temporarily stored in the RAM 13 or the like. Also, while not shown in the drawings, the play time is measured for the play time (play duration time) from the playing start to the playing end, using a clock circuit connected to the control unit 10. The play time is also correlated to the temporarily-stored history information, and the played tune data (played music history) made up of the tune title, tune tempo, play time, type of exercise, and intensity of exercise, is updated in step S108.

Thus, with the audio player according to the present embodiment, in the event that determination is made in the determination processing in step S105 that the difference between the action tempo of the user and the tempo of the music data being played is not within the predetermined range determined beforehand (outside of the predetermined range), the music data to be played is changed through the series of processing in step S107 and step S108.

Note that selection of music data regarding which the difference as to the action tempo of the user is within a predetermined range is not restricted to that stored and held in the recording medium of the music information storage device unit 21 of the audio player, and may be obtained and selected from a music information database provided in a server device on the network 100, and determined.

Of course, arrangements may be made wherein music data stored and held in the recording medium of the music information storage device unit 21 of the audio player is a subject of selection with priority, and in the event that there is no music data in the recording medium of the music information storage device unit 21 regarding which the tempo matches the conditions, the music database in the server device on the network 100 may be accessed, or the user may select beforehand whether to use music data stored and held in the recording medium of the music information storage device unit 21 of the audio player, or to use the music database in the server device on the network 100.

Then, following the processing in step S106, or following the processing in step S108, the control unit 10 of the audio player determines whether or not something has been done so as to end playing of the music data, such as the user operating a stop key or the like (step S109), and in the event that determination has been made that something has not been done so as to end playing, the processing from step S103 is repeated.

In the event that determination is made in the determination processing in step S109 to end playing, playing of the music data is ended and the played tune data (played tune history) shown in FIG. 8 regarding this music data is updated, and also, the exercise information analyzing circuit 23 is controlled to calculate the exercise amount of the user based on all played tune data (played tune history) including the played tune data (played tune history) updated this time, and personal profile information regarding which input was accepted at the beginning (step S110), and the exercise amount of the user calculated in this step S110 is displayed at the screen 34G of the display unit 34 by way of the display circuit 33 (step S111), and the processing shown in FIG. 3 ends.

Note that in the processing shown in step S110, information such as the exercise time, walking distance (distance traveled), average speed, out-calories, amount of fat burned, and so forth, are calculated, and these information are displayed on the screen 34G of the display unit 34 in a format such as shown in the display example of exercise information in FIG. 7, for example.

[Various Types of Exercise Amount Calculation Methods]

Next, an example of calculation processing of various types of exercise amount performed in step s110 shown in FIG. 3 will be explained in detail. As explained above as well, here, various types of exercise amounts in the case of performing predetermined exercise along with music played by the audio player according to the present embodiment are calculated. With this calculation processing, the exercise amount of the exercise which the user would have performed is calculated based on personal profile information such as weight, height, age, sex, and so forth, input by the user, and properties information of the played music data, made up of play time and tempo and so forth.

First, with regard to exercise time, this is the same as the play time of the music data. Accordingly, the exercise time of the user can be calculated by measuring and knowing the play time of the music data that has been played, storing and hold as played music data as shown in FIG. 8, and adding the play time of the music data that has been played.

Next, with regard to walking distance, this can be calculated based on the personal profile information and the properties information of the played music data. FIG. 9 is a diagram for explaining calculation of walking distance. As shown in Expression (1) in FIG. 9, it is known that the stride of a human when walking is a length equivalent to approximately 45 percent of the height. Also, as shown in Expression (2) in FIG. 9, it is known that the stride of a human when jogging is a length equivalent to approximately 50 percent of the height. Accordingly, the walking distance (traveled distance) can be obtained by multiplying the stride corresponding to the exercise which the user has performed, and the number of steps, as shown in Expression (3) in FIG. 9.

Accordingly, as shown in the first example in FIG. 9 for example, the walking distance of a person 170 cm in height having walked (walked) for 2 minutes 30 seconds along to music with a tempo of 120 can be calculated as shown in Expression (4) in FIG. 9 by first, obtaining the stride by performing computation of height×0.45, and since walking is being performed along with music with a tempo (beats per minute) of 120, the stride is multiplied by 120 steps (times) assuming that walking is being performed 120 steps (times) per minute, thereby obtaining the walking distance per minute, and this is multiplied by 2 minutes 30 seconds which is the exercise time (exercise duration time), thereby calculating that the walking distance is 229.5 m, as shown in (4) in FIG. 9.

Also, as shown in the second example in FIG. 9 for example, the walking distance of a person 170 cm in height having run (jogged) for 2 minutes 30 seconds along to music with a tempo of 170 can be calculated as shown in Expression (5) in FIG. 9 by first, obtaining the stride by performing computation of height×0.5, and since jogging is being performed along with music with a tempo (beats per minute) of 170, the stride is multiplied by 170 steps (times) assuming that walking is being performed 170 steps (times) per minute, thereby obtaining the walking distance per minute, and this is multiplied by 2 minutes 30 seconds which is the exercise time (exercise duration time), thereby calculating that the walking distance is 361.25 m, as shown in Expression (5) in FIG. 9.

Next, with regard to the average speed when exercising, this can be calculated based on the exercise time and walking distance which can be obtained as explained above. FIG. 10 is a diagram for explaining calculation of the average speed of travel when exercising. The speed can be obtained by distance traveled/time, so the average speed can be obtained by dividing the walking distance by the exercise time, as shown in Expression (6) in FIG. 10. Accordingly, the average speed in the case of traveling 3 km in 30 minutes can be calculated as being 6 km per hour (6 km/h) by the computation shown in Expression (7) in FIG. 10.

Next, with regard to out-calories (out-energy), a method for calculating based on out-energy per minute, and a method for calculating using a METS (Metabolic Equivalents) value which is a value indicating the exercise intensity set for each exercise, can be used.

FIG. 11 is a diagram for explaining a case of obtaining out-energy using out-energy per minute. The out-energy per minute Wmin can be obtained by dividing a value obtained by adding a constant value "35" to the speed at the time of exercising, by a value obtained by multiplying a constant value "2000" by the weight of the exerciser, as shown in Expression (8) in FIG. 11. Multiplying the out-energy per minute Wmin obtained in this way by the total exercise time (minutes) allows the out-energy (out-calories) burned by exercising the total amount of exercise time to be calculated.

Now, as shown in FIG. 11, in order to obtain the out-calories in the case of a person, 68 kg in weight, having walked for 60 minutes at a speed of 100 meters per minute m/min), first, the out-energy per minute Wmin is obtained, as shown in Expression (9) in FIG. 11. Then, as shown in Expression (10) in FIG. 11, the total of the out-energy in this case can be obtained by multiplying the out-energy per minute Wmin by 60 minutes which is the total exercise time. The out-energy (out-calories) in the case in this example is 275.4 kcal.

Also, FIG. 12 is a diagram for explaining a case of obtaining the out-energy using a METS value which is a value indicating the exercise intensity set for each exercise. Though explained later in detail, the METS value is selected in the processing in step S104 shown in FIG. 3 with the audio player according to the present embodiment, and is a value indicating the exercise intensity obtained beforehand for each of various types of exercises, and it is known that a METS value of 4 to 7 in the case of walking and a METS value of 7 to 15 in the case of jogging are values in the event of performing effective exercises, for example, as shown in FIG. 12.

Now, in the event of obtaining out-energy using a METS value, this can be obtained by multiplying the weight of the exerciser and the MESTS value and the exercise time as shown in Expression (11) in FIG. 12. For example, in the event that a person, 60 kg in weight, has performed exercise of an intensity of 5 METS for 30 minutes, the out-energy (out-calories) can be obtained as 150 kcal, as shown in Expression (12) in FIG. 12.

For example, if we say that there is played tune data (played history information), and the weight of the user which has performed exercise is 60 kg, as shown in FIG. 8, this can be obtained as 155.5 kcal, as shown in Expression (13) in FIG. 12. Note that in Expression (13) in FIG. 12, the first value 60 is the weight of the user, the calculation in the parentheses is for obtaining the addition value of values obtained by multiplying the play time and intensity of exercise for each of the tune A through tune G shown in FIG. 8, and the value 60 for dividing at the end is a value (60 minutes) for converting the play time from increments of minutes to increments of hours.

Thus, by using out-energy per minute, or by using a METS value which is a value indicating the exercise intensity set for each exercise, the out-energy (out-calories) in the case of performing exercise can be obtained. As shown in FIG. 11 and FIG. 12, the out-energy can be calculated by using weight which is one of the personal profile information of the exerciser, exercise time (exercise duration time) which can be taken as being the same as the play time of the music data at the audio player according to the present embodiment, and information such as speed and the like which can be calculated using this exercise time.

Also, the amount of fat burned can be calculated by using out-energy explained with reference to FIG. 11 and FIG. 12. FIG. 13 is a diagram for explaining a case of obtaining the amount of fat burned. As shown in FIG. 13 as well, it is known that approximately 7700 kcal of energy is spent to burn 1 kg (kilogram) of fat.

Accordingly, in order to obtain the amount of fat burned, as shown in Expression (14) in FIG. 13, the out-energy (kcal) is divided with 7700 kcal which is the energy necessary to burn 1 kg of fat, and further multiplied by 1000 g (grams) to match units, whereby this can be obtained. As explained with reference to FIG. 12, the out-calories of the user which has exercised, as known by the played tune list shown in FIG. 8, are 155.5 kcal, so calculation can be made that 20.19 g (grams) of fat have been burned, as shown in Expression (15) in FIG. 13.

In this way, the exercise time, walking distance, average speed, out-energy (out-calories), and amount of fat burned, can be calculated based on the personal profile information of the user who exercises while listening to the music played on the audio player according to the present embodiment, and the properties information of the played music data. In the processing of step S110 shown in FIG. 3, the calculation processing explained with reference to FIG. 9 through FIG. 13 is performed, whereby in step S111, exercise amount information to be notified to the user by displaying as shown in FIG. 7 can be calculated.

[About METS Value]

Now, the METS value indicating the intensity of exercise, used in calculation of out-energy which is known for each played music data as shown in FIG. 8, and explained with reference to FIG. 12, will be explained. FIG. 14 and FIG. 15 are diagrams for explaining about the METS value. The METS value is a value which is obtained by dividing the oxygen intake amount at the time of exercise by the oxygen intake amount at the time of resting, as shown in Expression (16) in FIG. 14.

As shown in FIG. 14 as well, the oxygen consumption amount when resting (oxygen intake amount at the time of resting) is represented by "R", the horizontal movement component which is the oxygen intake accompanying horizontal direction movement by "H", and the vertical movement component which is the oxygen intake accompanying vertical direction movement by "V". Note that the horizontal movement component at the time of walking can be obtained by (0.1×speed) as shown in Expression (18) in FIG. 14, and the horizontal movement component at the time of running can be obtained by (0.2×speed) as shown in Expression (19) in FIG. 14. Also, the vertical exercise component can be obtained by (0.9×speed×inclination) as shown in Expression (20) in FIG. 14.

Further, the oxygen intake amount at the time of exercise can be obtained as (R+H+V) as shown in Expression (17) in FIG. 14, and the oxygen intake amount at the time of resting is represented by R as explained above as well, so the METS value can be obtained by performing the computation of (R+H+V)/R, as shown in Expression (16) in FIG. 14. Note that as shown in FIG. 14, 1 METS is equivalent to oxygen consumption amount of 3.5 ml/kg·min (milliliter/kilogram·minute), and is the same as the oxygen intake amount at the time of resting.

Next, a specific calculation example of the above-explained METS value will be explained. As shown in FIG. 15, two examples will be considered. First, a case of calculating the METS value for walking at 6 km/h will be considered. As explained with reference to FIG. 14, the METS value can be calculated as long as the oxygen intake amount at the time of resting R, the horizontal movement component H, and the vertical movement component V are known. The oxygen intake amount at the time of resting R is known to be 3.5 ml/kg·min as shown in FIG. 14 as well, so the METS value can be calculated if the horizontal movement component H and the vertical movement component V are known.

Further, in the case of walking, the horizontal movement component H can be obtained by (0.1×speed per minute) as shown in Expression (18) in FIG. 14. Accordingly, in the case of walking at a speed of 6 km/h, the speed per minute is 100 m/min, so the horizontal movement component H can be calculated as being 10.0 ml/kg·min by Expression (21) in FIG. 15. On the other hand, the vertical movement component V can be obtained by (0.9×speed per minute×inclination) as shown in Expression (20) in FIG. 14. However, in the case of walking at a flat place, there is generally no occurrence of inclination at the time of exercise, so as shown in Expression (22) in FIG. 15, the inclination=0 rad(%), so the vertical movement component V is 0 (zero).

The oxygen intake amount at the time of resting R, the horizontal movement component H, and the vertical movement component V, obtained in this way, are added as shown in Expression (23) in FIG. 15, whereby the amount of oxygen intake at the time of exercise can be obtained, and by dividing this by the oxygen intake amount at the time of resting R, as shown in Expression (24) in FIG. 15, a METS value of "3.9" can be obtained. That is to say, the METS value for walking at a speed of 6 km/h is obtained as being "3.9".

Next, a case of calculating the METS value for jogging at 10 km/h will be considered. In this case as well, as explained above with the case of walking, the oxygen intake amount at the time of resting R is known, so the METS value can be calculated if the horizontal movement component H and the vertical movement component V are known. Now, in the case of running at a speed of 10 km/h, the speed per minute is 166.7 m/min, so the horizontal movement component H can be calculated as being 33.34 ml/kg·min by Expression (25) in FIG. 15.

On the other hand, in the case of running as well, as with the case of walking, there is generally no occurrence of inclination at the time of exercise, so as shown in Expression (26) in FIG. 15, the inclination=0 rad(%), so the vertical movement component V is 0 (zero).

The oxygen intake amount at the time of resting R, the horizontal movement component H, and the vertical movement component V, obtained in this way, are added as shown in Expression (27) in FIG. 15, whereby the amount of oxygen intake at the time of exercise can be obtained, and by dividing this by the oxygen intake amount at the time of resting R, as shown in Expression (28) in FIG. 15, a METS value of "10.5" can be obtained. That is to say, the METS value for running at a speed of 10 km/h is obtained as being "10.5".

Thus, the METS value which is the exercise intensity in the case of performing that exercise can be obtained for each type of exercise. Also, in the case of obtaining the out-energy using the METS value obtained as explained above, this can be obtained by weight×METS value×exercise time, as shown in Expression (11) in FIG. 12.

Also, as shown in FIG. 16, let us consider a case of calculating using the METS value, the out-energy (out-calories) of a person, 60 kg in weight, having run for 30 minutes at a flat place at a speed of 10 km/h (speed per minute 166.7 m/min). In this case, as shown in Expression (29) in FIG. 16, first, the computation of (3.5+166.7×0.2)/3.5 is performed, thereby obtaining the METS value, and the METS value, weight (60 kg), and time ((30/60) hours) are multiplied, whereby the out-energy is calculated as being "315.77 kcal".

Now, shown in detail, the out-energy calculation Expression using the METS value can be shown as in FIG. 17. For example, let us consider the case of walking. First, the speed per 1 exercise action (speed related to walking one step) Vi can be obtained by dividing the stride Ww by 1 exercise action time (time necessary to walk one step) Ti, as shown in Expression (30) in FIG. 17.

Once the speed per 1 exercise action Vi is known, the horizontal movement component can be obtained, as explained with reference to FIG. 14. Note that in the case of exercising in places with inclination, the vertical movement component can also be calculated if the inclination can be found out. However, in the case of walking at flat places, normally, there is no occurrence of inclination, so the METS value for 1 exercise action can be obtained in accordance with Expression (17) in FIG. 14 if the horizontal movement component is known.

Further, as shown in Expression (31) in FIG. 17, the out-energy spent by exercise to be calculated by totaling the multiplied result of the weight Weight, METS value METS (Vi) obtained from the speed of 1 exercise action Vi, and time per 1 exercise action Ti, over the exercise time. Note that Expression (31) in FIG. 17 can be rewritten as Expression (32) in FIG. 17.

Note that representative METS values which can be given are a METS value of 2 to 3 for walking at a speed of 3.2 km/h, a METS value of 3 to 4 for walking at a speed of 4.8 km/h, a METS value of 5 to 6 for walking at a speed of 6.4 km/h, and a METS value of 6 to 7 for walking at a speed of 8 km/h.

Also, the METS value for jogging at a speed of 8 km/h is 7 to 8, the METS value for jogging at a speed of 10 km/h is 11, and the METS value for jogging at a speed of 12 km/h is 12.5. Other than these, METS values for various types of exercises have been obtained, with cycling, aerobic dancing, jumping rope, and racquetball and so forth being exercises with relatively high METS values.

In this way, if the personal profile information of the user who performed the exercise, such as weight, height, stride, and so forth, and the attribute information of the music played at the time of exercising, such as the tempo and the like, are known, the exercise information such as the exercise amount of the user can be easily and speedily, and moreover accurately obtained, and can be provided to the user who has performed the exercise, or can be saved and analyzed or the like. Also, in the case of having detailed information such as age, sex, and so forth, as personal profile information, exercise information can be calculated with even further detail and accuracy, and this can be used.

[About Action Tempo and Distinguishing Type of Exercise]

Next, calculation of the action tempo and distinguishing of the exercise type that are performed at the exercise information analyzing circuit 23 of the audio player according to the present embodiment will be explained. FIG. 18 is a diagram illustrating the vertical direction output of the tri-axial acceleration sensor provided as the exercise information sensor 24, and in FIG. 18, the horizontal axis in time (seconds), and the vertical axis is voltage (millivolts), for example.

The exercise information analyzing circuit 23 obtains the detection output from the exercise information sensor 24 such as shown in FIG. 18, and by detecting the cycle of peak values in the detection output (detection waveform), can detect the action tempo. More specifically, following removing noise component by calculating the autocorrelation of the detection output from the exercise information sensor 24, the peak value is determined and by obtaining the cycle thereof, the action tempo can be accurately detected (calculated).

Also, as shown in FIG. 18, between when walking and when jogging, the magnitude of the acceleration component in the vertical direction is two times to three times greater for jogging, so whether the exercise that the user is performing is walking or jogging can be distinguished using this, by the amplitude value in the vertical direction.

Also, generally, exercise which users perform while listening to music is in many cases walking or jogging, but with regard to exercises such as cycling, rope jumping, or the like, for example, the features of the detection output of the exercise information sensor 24 can be known, and the features can be detected.

Also, for exercise regarding which automatic detection cannot be made, the user himself/herself can input or select the type of exercise to be performed and the exercise intensity by way of the key operating unit, thereby inputting into the audio player according to the present embodiment, and using this.

As explained above, by performing exercise while listening to music using the audio player according to the present embodiment, the tempo of the exercise being performed by the user (action tempo) is detected, and the music data to be played can be changed whenever suitable so as to play music data of a tempo corresponding to the action tempo.

In this way, due to change in the tempo of action (action tempo) of the exercise performed by the user (walking, jogging, running, muscle training, etc.) being detected and tunes (music data) of a tempo corresponding to the action tempo being selected and played, music data of a tempo corresponding to the exercise tempo of the user can always be played, instead of changing the playing tempo of the music data being played, so oneness between the actions (exercise) and music being played can be provided, without causing an unpleasant sensation. Note that here, a tune of a tempo corresponding to the action tempo means a tune of a tempo of which the difference as to the action tempo is within a predetermined range.

Also, by obtaining the exercise amount information which the user has performed from the tune information played along with the exercise, and this being presented to the user, a highly functional portable audio player and audio playing method can be provided, such as motivation of exercising for the user, enabling exercise to be continued in ease, and also enabling support of management of the amount of exercise, and so forth.

[About Another Example of the Operations of the Audio Player (Audio Playing Method) in the Case of Changing Tunes to be Played in Accordance with Action Tempo]

In the case of the operations of the audio player in the case of changing the tune to be played in accordance with the action tempo of the user explained with reference to FIG. 3, first, the music data is played and music is provided to the user, the action tempo of the user who has started exercise in accordance with this is sequentially detected, and the music data to be played is changed according to the action tempo of the user. Thus, the user can smoothly start exercise by the music of the music data first played.

However, there are cases that playing of music data corresponding to the action tempo of the exercise that the user is performing from the beginning is desired. This prevents music data of a tempo far faster or music data of a tempo far slower than the action tempo of the user being played from the start, and music data corresponding to the action tempo of the user can be played from the start of playing the music data.

Accordingly, in the case of the method explained below, first, the user starts exercise, the action tempo of the exercise is detected, and playing is started from music data corresponding to the detected action tempo. Note that with this other example as well, the audio player is configured in the same way as explained with FIG. 1 through FIG. 18, and has the same functions, and as explained below, only the processing program executed primarily at the control unit 10 differs.

Figure 19:
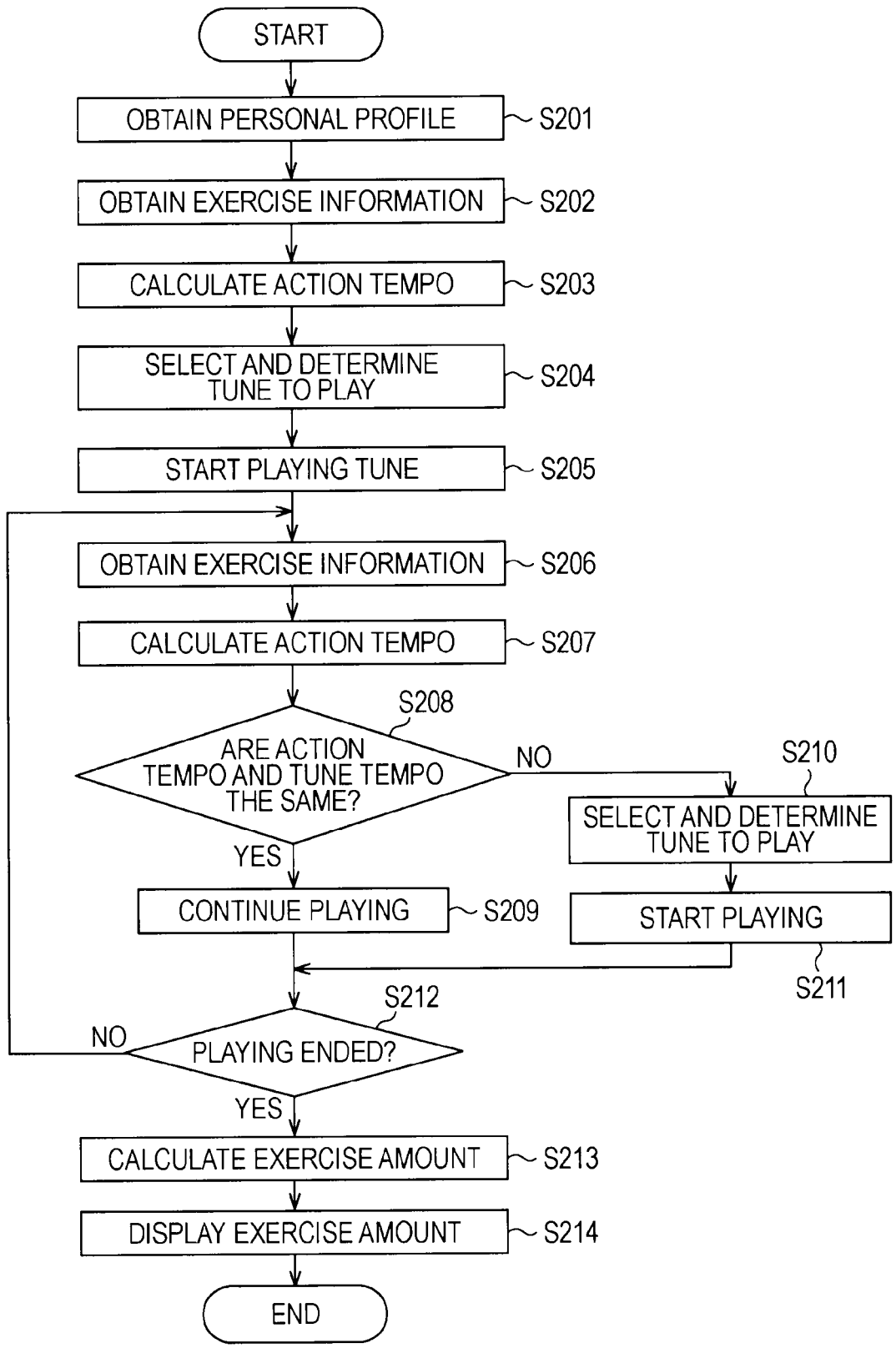
FIG. 19 is a flowchart for explaining another example of the operations of the audio player.

FIG. 19 is a flowchart for explaining another example the operations of the audio player. Upon the user of the audio player, who is to perform exercise such as walking or jogging or the like while listening to the music provided by playing the music data by way of the audio player according to the present embodiment, turning on the power of the audio player, the control unit 10 of the audio player according to the present embodiment executes the processing shown in FIG. 19, accepts input of personal profile information from the user, and obtains this (Step S201). In the processing of step S201, input of information as to the input screen or confirmation screen for personal profile information shown in FIG. 4 is accepted via the key operating unit 41, in the same way as with the processing of step S101 shown in FIG. 3.

Subsequently, the intended exercise such as walking or jogging or the like is started by the user at the intended action tempo before playing of the music data, so the control unit 10 controls the exercise information analyzing circuit 23 so as to obtain exercise information of the user (sensor detection output) through the exercise information sensor (acceleration sensor) 24 (Step S202), and the exercise information analyzing circuit 23 analyzes this, whereby the action tempo or the like of the user is calculated (step S203). The processing of step S202 and step S203 here is processing which is the same as step S103 and step S104 shown in FIG. 3.

Thus, following calculation of the action tempo of the user, the control unit 10 of the audio player according to the present embodiment controls the music playing data generating device unit 22 to refer to the tune information list shown in FIG. 5 for example, select and decide from the music data stored and held in the recording medium of the music information storage device unit 21 music data of a tempo of which the difference as to the action tempo of the user is within a predetermined range (step S204), and supply the decided music data to the audio signal output processing unit 31 and start the playing (step S205).

Thus, music data of a tempo corresponding to the action tempo of the user who is exercising (music data of a tempo of which the difference as to the action tempo of the user is within a predetermined range) can be selected and played from the start of playing the music data.

Subsequent processing is the same as the processing of step S103 through step S111 shown in FIG. 3. That is to say, the control unit 10 of the audio player according to the present embodiment controls the exercise information analyzing circuit 23 again such that the exercise information analyzing circuit 23 obtains exercise information (sensor detection output) of the user via the exercise information sensor (acceleration sensor) 24 (step S206), and the exercise information analyzing circuit 23 analyzes this, thereby calculating the action tempo and the like of the user (step S207). The processing in this step S206 and step S207 is processing which is the same as the above-explained step S202 and step S203.

Then, after calculating action tempo and so forth of the user, the control unit 10 of the audio player determines whether or not the calculated action tempo of the user and the tune tempo of the music data being played (tune tempo) are the same (step S208). In this step S208 as well, determination is made regarding whether or not the difference between the action tempo of the user and the tempo of the music data being played is within a predetermined range.

Upon determining in the determination processing in step S208 that the action tempo of the user and the tempo of the music data being currently played are the same, the control unit 10 of the audio player according to the present embodiment continues playing of the music data being currently played with no change (step S209). Note that in the processing in this step S209, processing for displaying the information indicating the type of exercise and the intensity of exercise calculated in step S207 is also performed so as to be displayed as with the playing display example shown in FIG. 6.

On the other hand, in the event that determination is made in the determination processing in step S208 that the action tempo of the user and the tempo of the music data being currently played are not the same, the control unit 10 of the audio player selects and determines music data from the tune information list shown in FIG. 5 for example such that the difference of the tempo thereof as to the action tempo of the user is within the predetermined range (step S210), and starts playing of the music data determined in this step S210 (Step S211).

In this step S211, the tune title, artist name, genre, tempo, type of exercise, and type of exercise are displayed regarding the music data for which playing has been newly started, with the playing display example shown in FIG. 6. Note that the tune title and tempo are obtainable from the tune information list shown in FIG. 5, the artist name and genre are obtained from a music database in a server on the network, and the type of exercise and intensity of exercise are calculated in the processing in step S203 or step S207.

Also, in step S211, processing for updating played tune data (played tune history) such as shown in FIG. 8 is also performed. That is to say, in the event of changing music data to be played corresponding to the action tempo of the user, the control unit 10 adds to and records history information made up of the tune title, tempo (tune tempo), play time, type of exercise, and intensity of exercise, of the music data which had been played up to then, for example, in played tune data (played tune history) compiled at the music information storage device unit 21 or storage device unit 53.

Now, the tune title and tune tempo are obtained from the tune information list shown in FIG. 5, and the type of exercise and intensity of exercise used are those calculated in step S203 and step S207, and these information are each correlated as history information and stored in the RAM 13 or the like. Also, while not shown in the drawings, the play time is measured for the play time (play duration time) from the playing start to the playing end, using a clock circuit connected to the control unit 10, and the played tune data (played tune history) made up of the tune title, tune tempo, play time, type of exercise, and intensity of exercise, is updated in step S211.

Thus, with the audio player according to the present embodiment, in the event that determination is made in the determination processing in step S208 that the difference between the action tempo of the user and the tempo of the music data being played is not within the predetermined range (outside of the predetermined range), the music data to be played is changed through the series of processing in step S210 and step S211.

Note that selection of music data regarding which the difference as to the action tempo of the user is within a predetermined range is not restricted to that stored and held in the recording medium of the music information storage device unit 21 of the audio player, and may be obtained and selected from a music information database provided in a server device on the network 100, and determined.

Of course, arrangements may be made wherein music data stored and held in the recording medium of the music information storage device unit 21 of the audio player is a subject of selection with priority, and in the event that there is no music data in the recording medium of the music information storage device unit 21 of which the tempo matches the conditions, the music database in the server device on the network 100 may be accessed, or the user may select beforehand whether to use music data stored and held in the storage medium of the music information storage device unit 21 of the audio player, or to use the music database in the server device on the network 100.

Then, following the processing in step S209, or following the processing in step S211, the control unit 10 of the audio player determines whether or not something has been done so as to end playing of the music data, such as the user operating a stop key or the like (step S212), and in the event that determination has been made that something has not been done so as to end playing, the processing from step S206 is repeated.

In the event that determination is made in the determination processing in step S212 to cause ending of playing, playing of the music data is ended and the played tune data shown in FIG. 8 regarding this music data is updated, and also, the exercise information analyzing circuit 23 is controlled to calculate the exercise amount of the user based on all played tune data (played tune history) including the played tune data (played tune history) updating this time, and personal profile information regarding which input was accepted at the beginning (step S213), and the exercise amount of the user calculated in this step S213 is displayed at the display screen of the display unit 31 (step S214), and the processing shown in this FIG. 19 ends.

Note that the exercise amount calculation processing shown in step S213 is processing the same as the processing of step S110 shown in FIG. 3, and is performed in the same way as with the processing explained with reference to FIG. 9 through FIG. 17. Also, in the processing of step S214, information such as the exercise time, walking distance (distance traveled), average speed, out-calories, amount of fat burned, and so forth, are calculated, and these information are displayed on the screen 34G of the display unit 34 in a format such as shown in the display example of exercise information in FIG. 7, for example.

In this way, in the event of the other example of operations of the audio player according to the present embodiment shown in FIG. 19, music data of a tempo corresponding to the action tempo of the user who is performing exercise from the start of playing of the music data can be played and provided to the user. Accordingly, music data of which the difference in tempo as to the action tempo of the user is outside of a predetermined range is not played, so the played music data does not disturb the tempo of the exercise which the user is performing.

[Operations of Audio Player in Case of Using Function for Automatically Selecting Tunes and Playing Music Data to be Played, Until Target Exercise Amount is Reached (Audio Playing Method)]

Next, the operations with the audio player according to the present embodiment in the event of automatically selecting and playing tunes to be played during the time up to reaching the target exercise amount of the user will be explained with reference to the flowchart shown in FIG. 20. Note that the operations of the audio player in the case of this example will be explained with reference to the earlier-used FIG. 4 (display information relating to personal profile), FIG. 5 (tune information list), FIG. 8 played tune data (played tune history), and also information displayed on the screen 34G of the display unit 34 shown in FIG. 21 and FIG. 22, as necessary.

Figure 20:
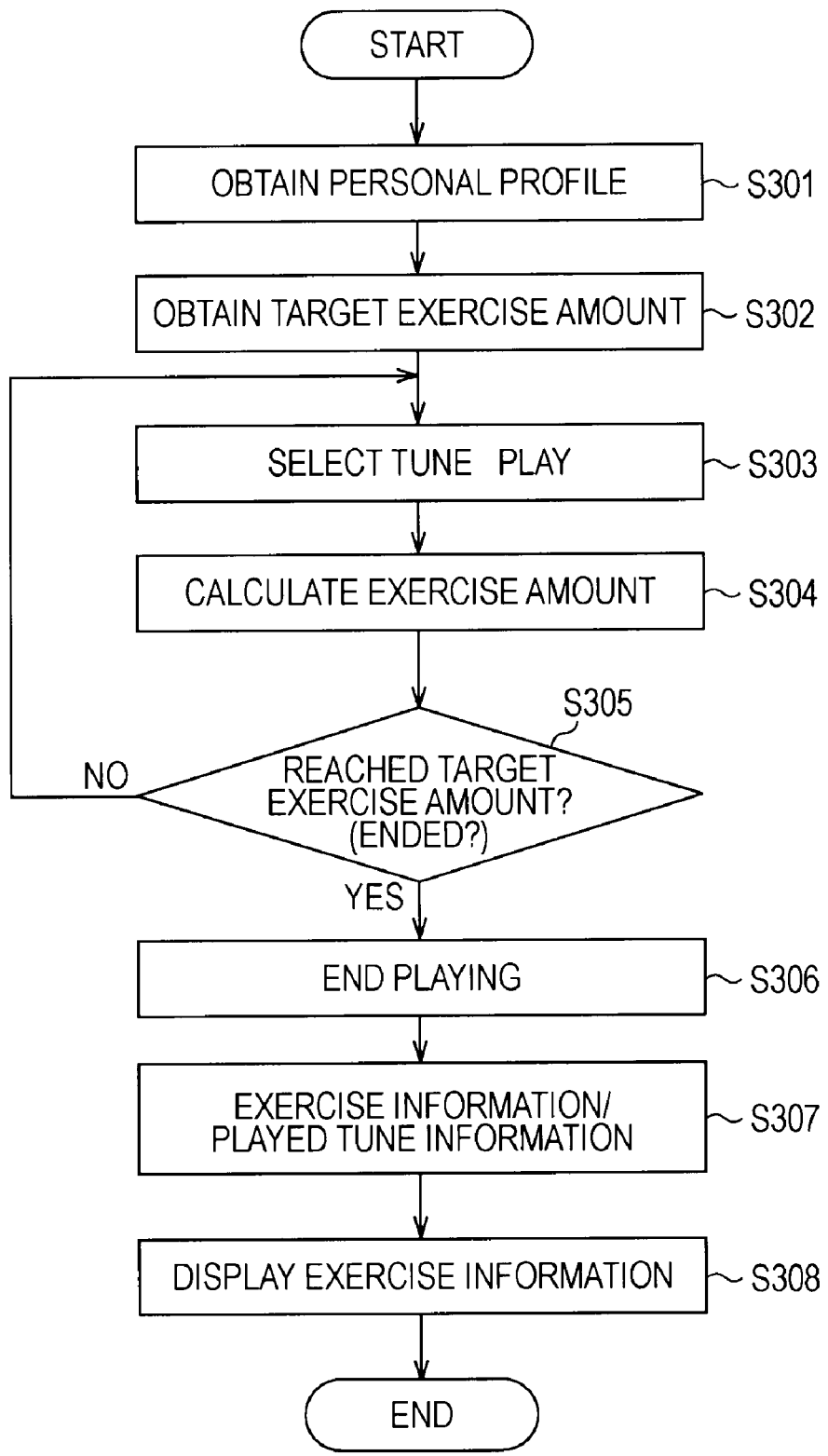
FIG. 20 is a flowchart for explaining the operations of the audio player in a case wherein tunes to be played are automatically selected during the time until the user reaches a target exercise amount.

FIG. 20 is a flowchart for explaining operations with the audio player according to the present embodiment in the event of automatically selecting and playing tunes to be played during the time up to reaching the target exercise amount of the user.

Upon the user of the audio player who is to perform exercise such as walking or jogging or the like while listening to music provided by playing music data through the audio player according to the present embodiment turning on the power of the audio player and selecting a function for automatically selecting tunes to be played during the period up to reaching the target exercise amount of the user by way of a menu displayed on the display screen 34G of the display unit 34 for example, the control unit 10 of the audio player according to the present embodiment executes the processing shown in FIG. 20.

Then, the control unit 10 first accepts input of personal profile information from the user via the key operating unit 41, and obtains this (step S301). In this step S301, an input screen for personal profile information shown in A in FIG. 4 for example is displayed, in the same way as with the case of the processing of step S101 shown in FIG. 3, and input from the user is accepted via the key operating unit 41. In the case of this example, input of personal profile information which is necessary for calculating the exercise amount of the user, such as the name, sex, age, height, weight, and so forth, of the user, is accepted, as shown in A in FIG. 4.

Upon accepting input of the personal profile information, as shown in B in FIG. 4 for example, the control unit 10 displays on the screen 34G of the display unit 34 a confirmation screen made up of the name, sex, age, height, weight, of the user, and BMI (Body Mass Index: a body volume index obtained by weight (kilograms)÷height (meters) to the second power) and degree of obesity calculated from the accepted height and weight, with confirmation input being requested, and in the event of not being correct, this can also return to the input screens shown in A in FIG. 4 and correction input can be performed. Note that in this FIG. 20 as well, the processing of step S301 is shown including such correction processing of the personal profile information.

Next, the control unit 10 accepts input of targeted exercise amount (target exercise amount) from the user via the key operating unit 41, and obtains this (step S302). Exercise time (exercise duration time), exercise intensity such as a METS value or the like for example, exercise distance (traveled distance), number of steps, out-calories, amount of fat burned, or the like, may be used as the target exercise amount, but here, explanation will be made with an example of a case using out-calories as the target exercise amount in order to simplify explanation.

FIG. 21 is a diagram for explaining an input screen for target exercise amount. A in FIG. 21 is an example of an input screen for target exercise amount in the case of an audio player having a display unit 34 with a relatively large display screen 34G, as shown in A in FIG. 2 and B in FIG. 2 for example, and B in FIG. 21 is an example of an input screen for target exercise amount in the case of an audio player having a display unit 34 with a relatively small display screen 34G, as shown in C in FIG. 2 for example.

With the case of A in FIG. 21, along with display of the execution function name of "calorie shuffle", a target calorie input space (the portion in which 100 kcal is shown in A in FIG. 21) is provided following the text string of "What is the calorie target?", so that input of the target calories can be made, along with which, following the text string of "OK?", a confirmation input space (the portion in which "Yes", "No" are shown in A in FIG. 21) is provided, such that input confirmation can be performed of the input target calories. That is to say, first, input of the target calories is accepted, and next, confirmation input is accepted, and if okay, advances to the next processing, and if not okay, enables accepting of input of target calories again.

Also, with the case of B in FIG. 21, along with display of the execution function name of "calorie shuffle", a target calorie input space (the portion in which 100.0 kcal is shown in B in FIG. 21) is provided, above which an up arrow 34UP, and below which a down arrow 34DW are displayed, indicating that the displayed value of the target calories can be changed. With the case of the example in B in FIG. 21 for example, the displayed value of the target calories can be changed by operating the dial type key operating unit 41 provided to the side face, as shown in C in FIG. 2. In the case of this example also, confirmation input can also be performed by performing predetermined key operations.

The control unit 10 performs processing for selecting music data (tunes) to be played, based on the tune information list which is a view list of playable tunes, compiled in the recording medium of the music information storage device unit 21, as explained with reference to FIG. 5, for example, and playing this (step S303). The music data selection processing in this step S303 can use various types of selection methods, such as for example randomly selecting tunes using random numbers or the like, or though explained later in detail, selecting based on playing history, such as selecting those with high usage frequency for example, or conversely, those with low usage frequency, with high priority, and so on.

Also, in step S303, following music data having been played, a music data playing display is displayed on the display screen 34G of the display unit 34 of the audio player. FIG. 22 is a diagram for explaining a display example of a playing display displayed on the display screen 34G of the display unit 34 of the audio player while music data is being played.

A in FIG. 22 is a display example of a music data playing display in the case of an audio player having a display unit 34 with a relatively large display screen 34G, as shown in A in FIG. 2 and B in FIG. 2 for example, and B in FIG. 22 is a display example of a music data playing display in the case of an audio player having a display unit 34 with a relatively small display screen 34G, as shown in C in FIG. 2 for example.

In the case of A in FIG. 22, information of the tune title and tempo and the like of the music data (tune) made to be played is displayed based on the tune information list. Of course, with regard to information such as artist name genre, and like information, in the event that this exists in the tune information list, or can be obtained via the network 100 or the like, these information can be displayed as shown in A in FIG. 22. Further, in the case of A in FIG. 22, in a case where exercise is performed along with the music data made to be played, information such as the type of exercise, out-calories, exercise distance, number of steps, and so forth, calculated in the later-explained step S304, can also be displayed.

Also, in the case of B in FIG. 22, the tune title of the music data (tune) made to be played, (predicted out-calories per unit time (e.g., 1 minute)) in the case of performing walking (Walk) and the case of performing jogging (Jog)), and further, in the case of B in FIG. 22 as well, in a case where exercise is performed along with tunes made to be played, information such as the out-calories and so forth, calculated in the later-explained step S304, can also be displayed. Of course, in the case of B in FIG. 22 as well, in a case where information such as artist name and the like exists in the tune information list, or can be obtained via the network 100 or the like, this can also be displayed as shown in B in FIG. 22.

Next, the control unit 10 controls the exercise information analyzing circuit 23 to analyze the detection output from the exercise information sensor 24, obtains the type of exercise such as whether walking, jogging, running, or so forth, for example, the exercise speed, number of times of exercise (number of steps), and so forth, and calculates and accumulates the actual exercise amount in the case of performing the exercise along with the music data being played, in the case of this example, out-calories (step S304).

Now, calculation of the type of exercise, exercise speed, number of times of exercise, and so forth, is performed using the magnitude of the acceleration component in the vertical direction (for example, between walking and jogging, the magnitude of shock is two times to three times greater for jogging) or cycle or the like in the event that the exercise information sensor 24 is a tri-axial acceleration sensor as explained above as well, and also, the play time of the music data can be used for the duration time of exercise. By using the method explained with reference to FIG. 9 through FIG. 12 using the exercise information thus calculated to calculate out-calories as actual exercise amount, and accumulating this, the out-calories from the point of starting exercise can be obtained as actual exercise amount.

Then, immediately before playing of the tune being played ends, the control unit 10 determines whether or not the exercise amount (accumulated value of out-calories) obtained in step S304 has reached the target exercise amount (target calories) received in step S302 (step S305). In the event that determination has been made in the determination processing in step S305 that the accumulated value of out-calories obtained in step S304 has not reached the target calories accepted in step S302, the processing from step S302 is repeated, with a tune to be newly played being selected and played, and exercise is continued.

Note that with that selection of the tune in step S302, the tune to be played may be selected with a predetermined method, or may be selected completely randomly. Also, the tune to be played may be selected based on history information of played tunes (played tune data), which will be explained later in detail.

In the event that determination is made in the determination processing in step S305, in the determination processing in step S305, that the accumulated value of out-calories obtained in step S304 has reached the target calories accepted in step S302, playing of the tune ends (step S306), and exercise information/played tune information are stored and held in the recording medium of the recording device unit 53, for example (step S307).

The various types of information of the exercise information/played tune information to be saved in the processing in step S307 can be saved in various formats. However, in the case of this example as well, as explained with reference to FIG. 8, for example, the tune title, tempo, play time, type of exercise which the user has performed, and the exercise intensity (METS value) of that exercise, for each tune played during the period from starting exercise to ending exercise equivalent to target out-calories, are recorded, for example, in the recording medium of the storage device unit 53, as exercise information/played tune information, i.e., as history information.

Then, based on the history information for each exercise for burning target out-calories, accumulation values of play time, out-calories, number of steps, and exercise distance, may be obtained for each tune, over a relatively long time period, as shown in FIG. 25, for example. In this case, the accumulation value of the play time can be obtained by accumulating the play time for each tune. Also, the accumulation value of out-calories can be obtained by accumulating the values obtained based on the weight in the personal profile information, the METS value, and the exercise time (tune playing time), following Expression (11) shown in FIG. 12.

Also, the accumulation value of the number of steps is obtained by the product of the tempo of the tune and the exercise time (playing time of the tune), or accumulation of the number of peaks of detection output form the exercise information sensor, and the accumulation value of the exercise distance is obtained by accumulating the value obtained in accordance with Expression (4) or Expression (5) shown in FIG. 9. Note that the accumulation value of out-calories can be obtained by accumulating the value obtained by the calculation expressions shown in FIG. 9 through FIG. 11, instead of using the METS value.

Note that here, the arrangement is such that the tune title, tempo, play time, type of exercise which the user has performed, and the exercise intensity (METS value) of that exercise, for each tune played, are saved as shown in FIG. 8, but is not restricted to this. The out-calories, number of steps, and exercise distance may be obtained for each tune played instead of the exercise intensity (METS value), and this may be saved. In this case, the processing of calculating out-calories, number of steps, and exercise distance each time and then accumulating at the time of compiling the accumulated history information such as shown in FIG. 25, for example, does not need to be performed.

Subsequently, the control unit 10 displays the exercise information in the display screen 34G of the display unit 34 (step S308), and ends this processing shown in FIG. 20. FIG. 23 is a diagram for explaining detailed examples of exercise information displays at step S308 in FIG. 20. Here, description will be made regarding a display example of exercise information in the case of an audio player having a display unit 34 with a relatively small display screen 34G, as shown in C in FIG. 2 for example.

A in FIG. 23 is an example of the case of displaying out-calories burned by the exercise performed today (information displayed at the topmost tier), and as a breakdown thereof, out-calories burned by walking (information displayed at the middle tier), and out-calories burned by running (information displayed at the bottommost tier). Note that while with the case of A in FIG. 23, description has been made of displaying out-calories burned by the exercise performed today, what is important is that this is a display example of out-calories in increments of 1 day, and display can be made in the same way in the case of display of out-calories for a specified date.

B in FIG. 23 is an example of the case of displaying out-calories burned by the exercise performed this month (information displayed at the topmost tier), and as a breakdown thereof, out-calories burned by walking (information displayed at the middle tier), and out-calories burned by running (information displayed at the bottommost tier). Note that while with the case of B in FIG. 23, description has been made of displaying out-calories burned by the exercise performed this month, what is important is that this is a display example of out-calories in increments of 1 month, and display can be made in the same way in the case of display of out-calories for a specified month.

C in FIG. 23 is a diagram for explaining an example of a case of displaying out-calories by day in a histogram. In the case of the example in C in FIG. 23, this is a display of multiple days worth (1 week worth in the case of the example in C in FIG. 23) of histogram display of out-calories by day. Thus, the change in out-calories by day can be confirmed at a glance.

Note that with the case of C in FIG. 23, an example is given of a case of histogram display of out-calories by day for 1 week, but is not restricted to this. Histogram display of out-calories by day can be made for an arbitrary number of days, such as for example, 3 days worth, 5 days worth, 6 days worth, 10 days worth, or so on, within a range permissible by the size of the display screen 34G.

D in FIG. 23 is a diagram for explaining an example of a case of displaying out-calories by month in a histogram. In the case of the example in D in FIG. 23, this is a display of multiple months worth (12 months worth in the case of the example in D in FIG. 23) of histogram display of out-calories by month. Thus, the change in out-calories by month can be confirmed at a glance.

Note that with the case of D in FIG. 23, an example is given of a case of histogram display of out-calories by month for 12 months, but is not restricted to this. Histogram display of out-calories by month can be made for an arbitrary number of months, such as for example, 3 months worth, 4 months worth, 6 months worth, or so on, within a range permissible by the size of the display screen 34G.

Thus, enabling the exercise history information to be presented to the user enables the user to objectively comprehend how much exercise he/she is performing, and the user can be provided with motivation for performing exercise which is preferably continued, and support enabling continuation of exercise.

Note that while FIG. 23 is an example of a case of showing the accumulation value of out-calories by period, an arrangement may be made wherein the exercise amount is shown by played tunes. FIG. 24 is a diagram for explaining a display example of a case wherein exercise information is displayed in increments of tunes.

In FIG. 24, displayed at the topmost tier is a display of a note mark indicating that the following information is a tune title, the tune title ("aaaaa" is shown in FIG. 24.), and a display of the out-energy per unit time (e.g., 1 minute) in the case of walking in accordance with this tune ("Walk: 6.2" is shown in FIG. 24) and a display of the out-energy per unit time (e.g., 1 minute) in the case of running in accordance with this tune ("Run: 25.0" is shown in FIG. 24).

In FIG. 24, displayed at the middle tier is a mark (a mark formed of a ○ and a △) indicating that the following information is artist name, the artist name ("AAAAA" is shown in FIG. 24.), and a display of the average out-calories in the case of exercising according to this tune, based on past history information ("Past average: 12.6" is shown in FIG. 24.).

Also, in FIG. 24, displayed at the bottommost tier is a display of actual out-calories at the user ("8.9 kcal" is shown in FIG. 24.), and the breakdown thereof as the out-calories burned by walking ("Walk: 3.2" is shown in FIG. 24.) and the out-calories burned by running ("Run: 5.7" is shown in FIG. 24.).

Thus, by displaying exercise information for each played tune, during playing of which tune energy was efficiently burned (exercise was efficiently performed) can be known. Accordingly, tunes with which exercise can be efficiently performed can be identified, and this can be aggressively used to perform exercise and so forth.

Note that with the processing shown in FIG. 20, explanation has been made that exercise is continued during the period up to achieving the target exercise amount, but is not restricted to this. For example, exercise for achieving the target exercise amount can be performed divided into multiple days. In such a case, for example, an operation is performed wherein this is temporarily stopped, and playing is later resumed, whereby processing shown in FIG. 20 can be made again from the actual exercise amount accumulated at the time stopped at the previous time.

[About Usage Example of History Information]
[About Creating a Playlist Using History Information]

FIG. 25 is a diagram for explaining an example of exercise/play history information created in the recording medium of the storage device unit 53 for example, of the audio player according to the present embodiment. As explained above as well, in the case of the audio player according to the present embodiment, played tune history is saved for each played tune as shown in FIG. 8, in the processing in step S307, as explained with reference to FIG. 20.

Then, as also explained above, based on the played tune history shown in FIG. 8, or, as also explained above, for each tune played, played tune history made up of the tune title, tempo, play time, type of exercise performed by the user, out-calories, number of steps, and exercise distance, is counted for each tune, thereby enabling history information accumulated over a relatively long period such as shown in A in FIG. 25 to be formed. Specifically, history information can be accumulated in increments of 1 week, increments of 1 month, increments of 1 year, for example. Of course, history information can be accumulated in increments such as several weeks, increments of several months, or increments of several years.

Using the exercise/play history information formed by accumulating played tune history over a long period as shown in A in FIG. 25, new extraction conditions can be set as shown in B in FIG. 25, so as to create a playlist (play candidate list) which did not exist before. Specifically, as shown in B in FIG. 25, things can be performed such as extracting and playing the top 10 tunes with long accumulation of play time (top 10 tunes in play time), or selecting tunes with accumulation of the number of steps of 5000 steps or more and performing shuffled playing, or extracting and playing 10 tunes in the order of few accumulated out-calories, and so on.

Also, for example, other various types of conditions can be set to extract tunes to be played, such as setting conditions combining multiple information, like extracting those with a predetermined value or lower in play time but a predetermined value or higher in out-calories, or extracting those with a predetermined value or lower in play time but a predetermined value or higher in the number of steps, or the like.

The method for creating a playlist using the history information explained with reference to FIG. 25 can be used in cases of selecting tunes to be played in step S303 in the processing shown in FIG. 20 or the like, for example. Of course, this can be used in various types of cases for creating playlists according to purpose.

That is to say, switching of the tunes which can be selected and played, changing of the types and number of tunes which can be selected and played, and so forth, can be performed based on the history information.

[Example of Providing Privileges Based on History Information]

This is arranged such that, in the event of detecting that, for example, the accumulation value of a predetermined exercise amount has reached a value which has been predetermined, based on the exercise/play history information shown in A in FIG. 25, some sort of privilege can be provided to the user, thereby providing motivation for performing exercise which is preferably continued over a long period, and support enabling continuation of exercise.

FIG. 26 is a diagram for explaining specific examples of a case of providing privileges based on the history information. Of these, A in FIG. 26 illustrates an example of a case of providing a privilege wherein, in a case in which the accumulated value of a predetermined exercise amount is the accumulated value (cumulative total) of out-calories, and a value determined corresponding thereto is 1000 kcal, in the event that the out-calories exceed 1000 kcal, a privilege is provided wherein, a hidden tune "○○○" which had been recorded and held in the recording medium of the music information storage device unit 21 but was not able to be played until then, can be played.

The control unit 10 of the audio player 10 according to the present embodiment saves played tune history such as explained with reference to FIG. 8 each time exercise is performed, in the recording medium of the storage device unit 53, sums up the played tune history at a predetermined timing, for example, the timing of ending exercise or the like, and forms exercise/played history information such as shown in A in FIG. 25, so the total out-calories are confirmed.

Then, in the event that the total out-calories exceed kcal, the control unit 10 forms screen information for displaying information such as shown in A in FIG. 26, and displays this on the display screen 34G of the display unit 34 via the display circuit 33. Then, upon the user performing predetermined operations such as confirmation input or the like, information regarding the tune "○○○" which was not able to be played until then is added to the tune information list which is a view list of playable tunes such as shown in FIG. 5, so that the tune "○○○" can be played at all times.

Thus, by providing the privilege of enabling playing of tunes which could not be played until then in the event of performing a predetermined amount of exercise, the user desires to increase newly-playable tunes, thereby providing motivation for performing exercise which is preferably continued for a long time, and support enabling continuation of exercise.

Also, B in FIG. 26 illustrates an example of a case of providing a privilege wherein, in a case in which the accumulated value of a predetermined value is the accumulated value (cumulative total) of out-calories, and a value predetermined corresponding thereto is 1000 kcal, and in the event that the out-calories exceed 1000 kcal, a predetermined tune "△△△" can be downloaded for free.

In this case as well, the control unit 10 saves played tune history such as explained with reference to FIG. 8 each time exercise is performed, in the recording medium of the storage device unit 53, sums up the played tune history at a predetermined timing, for example, the timing of ending exercise or the like, and forms exercise/played history information such as shown in A in FIG. 25, so the total out-calories are confirmed.

Then, in the event that the total out-calories exceed 1000 kcal, the control unit 10 forms screen information for displaying information such as shown in B in FIG. 26, and displays this on the display screen 34G of the display unit 34 via the display circuit 33. Then, upon the user performing predetermined operations such as confirmation input or the like, usage of an access ID stored in ROM 12 or the like beforehand is permitted, for example.

The control unit 10 then controls the communication I/F 61, accesses a predetermined server device via the network 100 such as the Internet, and transmits the access ID regarding which usage has been permitted to the server device, and following establishment of verification, the predetermined tune "△△△" is downloaded.

Accordingly, the predetermined tune "△△△" is downloaded from the predetermined server device to the audio player according to the present embodiment, and this is saved in the recording medium of the music information storage device unit 21, and also necessary information is added to the tune information list such as shown in FIG. 5, so that the tune "ΔΔΔ" can be played at all times.

Thus, providing the privilege of enabling downloading of new tunes in the event of performing a predetermined amount of exercise provides motivation for performing exercise which is preferably continued for a long time, and supports enabling continuation of exercise.

Note that while in the case of the example shown in this FIG. 26, description has been made with reference to an example of a case of using the accumulated value (cumulative total) of out-calories as an accumulated value of a predetermined value, this is not restricted to this. The number of steps or the exercise distance may be used, or the accumulated value of play time of predetermined tunes may be used.

Also, access to the server device may be performed via the transmission/reception circuit 62, transmission/reception antenna 63, and wireless LAN system.

[Modification of Example of Providing Privileges Based on History Information]

In the case of the example shown in FIG. 26, this is arranged such that, in the event of detecting that the accumulated value of the predetermined value has reached the value determined beforehand, some sort of privilege is provided to the user. That is to say, providing of a privilege is only the case of the one time of the accumulated value of the predetermined value reaching the value determined beforehand. However, this is not restricted to this.

Figures 27, 28:
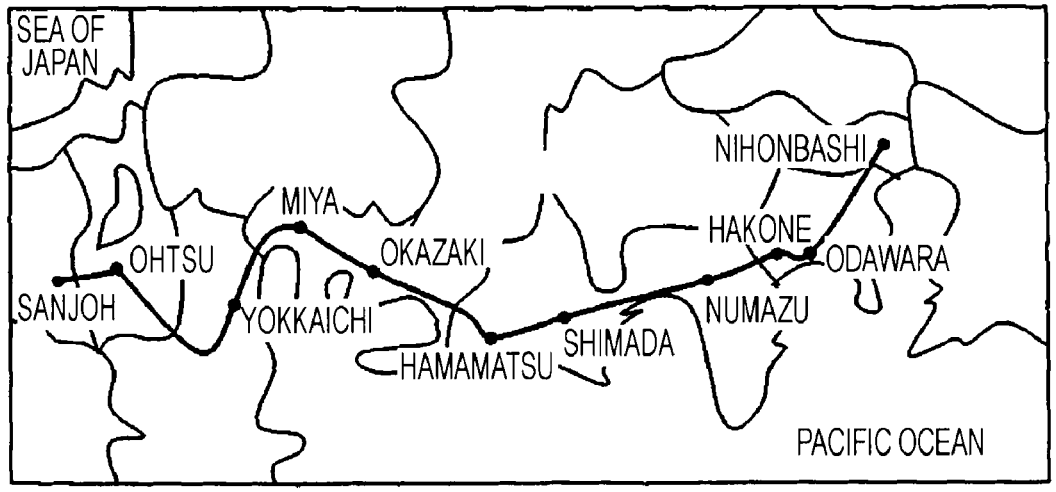
FIG. 27 is a diagram for explaining an example of a case of providing privileges in accordance with accumulation values of exercise distance as accumulation values of exercise amount.
FIG. 28 is a diagram for explaining an example of a case of providing privileges in accordance with accumulation values of exercise distance as accumulation values of exercise amount.

For example, an arrangement may be made wherein the accumulated value of the exercise amount is comprehended, and multiple privileges are provided in accordance with the degree of achievement thereof. FIG. 27 and FIG. 28 are diagrams for explaining an example of using the accumulated value of exercise distance as the accumulated value of exercise amount, and in the event that the accumulated value of exercise distance reaches a distance equivalent to each post station on the Fifty-three Stages of the Tokaido of which the starting point is Nihonbashi, privileges are provided.

As shown in FIG. 27, in the case of the Fifty-three Stages of the Tokaido, large post stations include Odawara, Hakone, Numazu, Shimada, Hamamatsu, Okazaki, Miya, Yokkaichi, and so forth. Accordingly, as shown in FIG. 28, the distance to each post station starting from Nihonbashi is comprehended beforehand, and this is stored in the recording medium of the storage device unit 53 for example, as a privilege table.

The table shown in this FIG. 28 has the distance from Nihonbashi stored for each post station, and also stored are identification information of a local song of that post station (shown as tune a, tune b, tune c, . . . in FIG. 28) and the section of those to whom the privilege can be provided, and identification information of local products to given as presents and the section of those to whom the privilege can be provided.

The section of those to which the privilege can be provided is a section of users who can receive providing of a local song, and a section of users who can receive presents of local products. Accordingly, in the event that the user has performed exercise while playing tunes using the audio player according to the present embodiment, and in the case the exercise distance thereof has exceeded the distance to each post station in the table shown in FIG. 28, a local song for the corresponding post station stored in the music information storage device unit 21 of the audio player according to the present embodiment beforehand can be played. The privilege of playing the local song can be received by all users who have cleared the exercise distance from Nihonbashi to each post station, as the section adjacent to the item "tune" indicates.

Also, in the event that the user has performed exercise while playing tunes using the audio player according to the present embodiment, and in the case the exercise distance thereof has exceeded the distance to each post station in the table shown in FIG. 28, use of an identification ID stored in the ROM 12 is enabled for example, and the control unit 10 can access a predetermined server device on a network such as the Internet via the communication I/F 61 and enter a drawing for a present of a predetermined local product. In this case, as indicated by the section adjacent to the item "local product", there are local products given as presents from applicants participating in the drawing, and local products given as presents to all applicants.

Thus, this provides motivation for continuing to perform target exercise which, and also supports enabling continuation of exercise, over an even longer period of time.

While the example shown in FIG. 27 and FIG. 28 provides privileges by corresponding the accumulated value of exercise distance detected form the user who has performed exercise while listening to tunes played on the audio player according to the present embodiment, with the distance to each post station on the Fifty-three Stages of the Tokaido of which the starting point is Nihonbashi, but is not restricted to this.

Various applications may be made, such as, for example, using the analogy of the course of the Paris-Dakar rally, using the distance from Paris as the starting point to each check point, or using the analogy of various freeways, and using the distance from the starting point to each interchange, or using the analogy of the travel path of a main character in various stories, and using distance from a start point to each point location, and so on.

While exercise distance has been used here, the accumulation value of the number of steps or out-calories may also be used. In this case, the number of steps or out-calories may be converted into distance, or the number of steps or out-calories may be used without change and assume various target values, so that various privileges are provided each time cleared.

Also, providing of privileges is not restricted to providing local songs or presents of local products, as explained with reference to FIG. 27 and FIG. 28. For example, in the event of reaching each achievement point, a completion messages may output by video or audio, such as displaying a display message such as "Reached ○○. Congratulations.", or outputting an audio message such as a fanfare, or the like.

Also, an arrangement may be made wherein partway progress is notified in the event of performing a predetermined operation as to the audio player. For example, in the case of the example shown in FIG. 27 and FIG. 28, in the event of performing a predetermined operation for outputting partway progress, a display can be made on the display screen of the display unit 34 to display such as "Travel distance cumulative total is ΔΔ km. □□ km remaining to Odawara.", or output a similar audio message via the audio signal output processing unit 31 and speaker 32.

That is to say, the partway progress and remaining amount as to the target and so forth can be notified at appropriate timing. Also, achievement status and achievement percentage and so forth can also be output. For example, in the case of the example shown in FIG. 27 and FIG. 28, in the event that a predetermined operations has been made for outputting the achievement status, the achievement status so far can be output such as "Odawara, Hakone, and Numazu have already been passed.", and also in the event of having performed a predetermined operation for outputting the achievement percentage, the achievement percentage as to the entire distance may be output such as "21 percent of the entire distance has been completed.", or the like.

Of course, the achievement status or achievement percentage as to partway achievement points may be output as well. In either case, the control unit 10 comprehends the status of partway progress, remaining amount as to the target value, achievement status, achievement percentage, and so forth, in accordance with the history information stored in the recording medium of the storage device unit 53, and can display this via the display circuit 33 and display unit 34 or output this via the audio signal output processing unit 31 and speaker 32.

Also, with the present embodiment, description has been made that the privilege table shown in FIG. 28 is stored in the recording medium of the storage device unit 53, but is not restricted to this. The privilege table may be provided at a server device on the network, with the audio player transmitting the accumulation value of exercise amount to the server device at a predetermined timing, and performing privilege providing processing, including determination processing regarding whether or not the target exercise amount has been achieved, at the server device side.

Also, access to the server device in this case as well, can be performed via the transmission/reception circuit 62, transmission/reception antenna 63, and wireless LAN system.

[Other Example of Calculation Method of Exercise Amount]

In the above-explained embodiment, calculation of out-calories were comprehended by calculating based on the personal profile information that is input, and the tempo of a tune played at the time of exercise and the exercise time, as explained with reference to FIG. 9 through FIG. 11, or calculated using the weight in the personal profile information that is input, a METS value, and the exercise time, as explained with reference to FIG. 12. However, this is not restricted to this. This can be comprehended more conveniently.

FIG. 29 is a diagram for explaining a calculation example of a case of easily obtaining the out-energy. Let us assume a case wherein the exercise that the user is to perform is walking, and the stride of the user is 0.7 m (70 cm) which is an average value thereof. In this case, the out-calories can be obtained by multiplying the constant 0.5, the weight, and the walked distance (exercise distance) as shown in Expression (33) in FIG. 29, and in the event of using the number of steps instead of the walking distance, the out-calories can be obtained by multiplying the constant 0.00035, the weight, and the number of steps, as shown in Expression (34) in FIG. 29.

Also, let us assume a case wherein the exercise that the user is to perform is walking, and the traveling speed of the user is 4 km/h (4 km per hour) which is an average value thereof. In this case, the out-calories can be obtained by multiplying the constant 0.5, the weight, and the walked distance (exercise distance) as shown in Expression (35) in FIG. 29, and in the event of using the exercise time instead of the walking distance, the out-calories can be obtained by multiplying the constant 0.033, the weight, and the exercise time, as shown in Expression (36) in FIG. 29.

Also, let us assume a case wherein the exercise that the user is to perform is jogging, and the stride of the user is 0.7 m (70 cm) which is an average value thereof. In this case, the out-calories can be obtained by multiplying the constant 1.0, the weight, and the walked distance (exercise distance) as shown in Expression (37) in FIG. 29, and in the event of using the number of steps instead of the walking distance, the out-calories can be obtained by multiplying the constant 0.0007, the weight, and the number of steps, as shown in Expression (38) in FIG. 29.

Also, let us assume a case wherein the exercise that the user is to perform is jogging, and the traveling speed of the user is 8 km/h (8 km per hour) which is an average value thereof. In this case, the out-calories can be obtained by multiplying the constant 1.0, the weight, and the walked distance (exercise distance) as shown in Expression (39) in FIG. 29, and in the event of using the exercise time instead of the walking distance, the out-calories can be obtained by multiplying the constant 0.13, the weight, and the exercise time, as shown in Expression (40) in FIG. 29.

Thus, by assuming the traveling speed at the time of exercise or number of steps as an average value thereof, the out-calories burned by the exercise which the user has performed can be easily calculated as shown in FIG. 29.

Note that by using simple calculation expressions as explained above, the exercise amount can be comprehended without burdening the CPU, so reduction in size and conservation of electric power consumption of the audio player can be promoted.

However, in the event that the audio player is relatively large in size, and there are no restrictions such as the capabilities of the CPU, electric power consumption, and so forth, the exercise amount can be calculated more accurately taking into consideration age and sex, as a matter of course.

Thus, the audio player according to the present embodiment can select and play tunes with a predetermined method during the period until the exercise (walking, jogging, running, etc.) which the user is performing, reaches the target exercise amount. Also, along with switching of the tunes which can be selected and played, and changing of the types and number of tunes which can be selected and played, and so forth, entertainment may be provided by providing privileges based on the accumulation of exercise amount or the like (hidden tunes can be played, bonus tunes can be downloaded, and so forth), using the history of past exercise (exercise history) or the history of tunes played in the past (playing history) and so forth. Thus, this provides motivation for performing exercise which is preferably continued over a long period of time, and also means can be realized for supporting continuation of exercise and management of exercise amount.

[Other]

Also, programs (software) for executing the processing of each step in the flowcharts shown in FIG. 3, FIG. 19, and FIG. 20, can be created. Then, by creating programs (software) matching FIG. 3, FIG. 9, or FIG. 20, and implementing this in various types of audio players, the audio player and audio playing method according to the present invention can be relatively easily realized.

Also, in a case of selecting and determining music data of a tempo of which the difference as to the action tempo of the user is within a predetermined range, there may be cases wherein multiple selectable music data exist. In order to deal with such a case, an arrangement may be made wherein music data to be selected with priority is identified by genre or artist, for example, by registering genre or artist of music data to be selected with priority.

Also, an arrangement may be made wherein date information is provided to each of the playable music data in the audio player such as release date thereof, with the music data to be selected being narrowed down based on date information, such as music data having new date information being selected with priority, or conversely, music data having old date information being selected, and so forth.

Also, an arrangement may be made wherein information such as usage frequency or popularity ranking is added to each of the playable music data, with the music data to be selected being narrowed down based on these information. What is important is that the music data to be selected can be narrowed down, and music data can be speedily selected and determined, based on added information of the playable music data.

Also, with the above-explained embodiment, description has been made assuming a case wherein the exercise which the user performs would primarily be walking or jogging, but this is not restricted to this. At least, this may be those included in the range of so-called ambulatory exercises such as walking, jogging, running, dashing, and so forth, those which can be continued over a relatively long period of time, such as cycling, rowing, rope jumping, and so forth, and further, so-called muscle training such as sit-ups, back pull-ups, push-ups, and so forth.

Accordingly, an audio player to which the present invention has been applied may be installed in a cycling machine, rowing machine, indoor running machine, or the like, used at sport clubs or the like. In this case, the exercise performed is known beforehand, so the intensity of the exercise can be accurately obtained from the action tempo in the event of performing these, and calculating of exercise amount can be performed more precisely.

In this way, the present invention is not restricted to portable type audio players, and may be applied to desktop audio players, portable audio players installed in various types of training machines, and so forth. Of course, the fact that this can be applied to various types of portable type audio players such as portable type hard disk recorders, IC players, cellular telephone terminals with music playing functions, and so forth, as mentioned earlier.

Also, for the information of the exercise amount to be calculated, it is sufficient for one or more information which the user needs, out of exercise time, exercise distance such as walking distance, average speed, out-calories, amount of fat burned, and so forth, to be calculated and presented. Also, a pulse sensor, blood pressure sensor, thermometer, and so forth may be used in combination, with information of these being obtained and presented to the user.

Also, for the profile information of the user, it is sufficient for the name, age, height, weight, etc., to be input, and also, information indicating stride may be input as profile information, with an arrangement wherein the stride is measured accurately. Other than these, pulse, blood pressure, body temperature, and so forth, when not active, may be input, or measured and be input.

Also, as explained above, the tune information list shown in FIG. 5 is not restricted to this, and various types of added information may be added, such as genre, artist, date of release, popularity ranking, and so forth. Such various types of added information may be provided to the audio player of the user through a music database or the like in a server device provided on the network 100, or may be provided to the audio player of the user via a recording medium such as a CD (Compact Disc), DVD (Digital Versatile Disc), semiconductor memory card, or the like, for example.

Also, as explained above, various types of recording media can be used for the recording medium of the music information storage device unit 21 or the storage device unit 53 installed in the audio player, such as optical discs like CD or DVD, magneto-optical discs such as MD ((Mini Disc) a registered trademark), magnetic tape, hard disk, semiconductor memory, IC memory card, and so forth.

Also, the arrangement may be configured such that the control unit 10 is provided with non-volatile memory such as EEPROM (Electrically Erasable and Programmable ROM) or flash memory or the like, for example, other than the recording medium of the music information storage device unit 21 or the storage device unit 53, with information such as music information lists and played tune lists being compiled therein.

Also. With the above-explained embodiment, description has been made primarily regarding an example of a case of playing music data, but is not restricted to this. The present invention can be applied to cases of playing AV (Audio/Visual) data which also plays music data synchronously to video data played via the display circuit 33 and display unit 34.

Also, an arrangement may be made wherein functions and the like are implemented which automatically generate a tune list to be played at the time of exercise, from the target exercise time or target exercise amount which the user has input beforehand, and these functions are used in combination. Also, tunes may be presented from the exercise information which the user has input. In this case as well, exercise amount information can be obtained in the same way as with the case of using the information of the exercise information sensor to detect the exercise tempo of the user and select and present tunes.

Also, playlists may be created and registered by the user preparing beforehand the exercise type, time, intensity, and play tune data, other than the function of automatically selecting and playing music data of a tempo corresponding to the action tempo of the user, and in this case as well, the exercise amount information can be obtained in the same way as with the previous example. (e.g., can be used at circuit training or the like)

As explained using FIG. 27 and FIG. 28, by forming a program for performing processing for comprehending the accumulated value of exercise amount, and providing privileges multiple times in accordance with the degree of achievement, and implementing this in the audio player, various types of audio players can implement functions of comprehending the accumulated value of exercise amount, and providing privileges multiple times in accordance with the degree of achievement.

Specifically, it is sufficient to create an audio playing program for executing at least a history information creating step for creating history information correlating identification information of played music data, and actual exercise amount at the time of playing the music data, a storage processing step for storing and holding the history information created in the history information creating step in a recording medium, and a privilege providing step for providing a predetermined privilege in the event that the actual exercise amount of the history information stored in the storage medium has achieved a target exercise amount, and to store this in ROM or non-volatile memory so as to be readable by the CPU.

Note that with the privilege providing step, depending on the privileges to be provided, there are cases wherein the control unit 10 realizes the function thereof, or the control unit 10 primarily realizes the function thereof in cooperation with a server device connected to via the communication I/F 61 and the network 100, or a server device connected to via the transmission/reception circuit 62, transmission/reception antenna 63, and further a wireless LAN system.

The invention claimed is:
1. An audio player comprising:
means for receiving an input of profile information relating to physical characteristics of a user of the audio player;
means for calculating at least one additional physical characteristic of the user based on the input profile information prior to the user beginning exercising;

means for displaying the profile information input by the user and the at least one additional calculated physical characteristic of the user prior to the user beginning exercising;

playing means for playing music data;

sensor means for detecting changes in actions of the user caused by the user exercising;

detecting means for detecting an action tempo of the user at a plurality of predetermined times following starting of playing of music data through said playing means, based on a detection output from said sensor means;

determining means for determining whether a first difference, the first difference being between a tempo of music data being played by said playing means and the action tempo of the user detected by said detecting means, is within a predetermined range;

searching means for identifying, when said determining means determines that the first difference between the tempo of music data being played and the action tempo of the user is outside of the predetermined range, music data having a tempo of which a second difference as to the action tempo detected by said detecting means is within the predetermined range; and changing means for changing the music data played by said playing means to the music data identified by said searching means.

2. An audio player comprising:

means for receiving an input of profile information relating to physical characteristics of a user of the audio player;

means for calculating at least one additional physical characteristic of the user based on the input profile information prior to the user beginning exercising;

means for displaying the profile information input by the user and the at least one additional calculated physical characteristic of the user prior to the user beginning exercising;

playing means for playing music data;

sensor means for detecting changes in actions of the user caused by the user exercising;

first detecting means for detecting an action tempo of the user before playing of music data through said playing means, based on a detection output from said sensor means;

first searching means for identifying music data having a tempo of which a first difference as to the action tempo detected by said first detecting means is within a predetermined range;

playing control means for controlling the music data identified by said first searching means to be played through said playing means, second detecting means for detecting an action tempo of the user at a plurality of predetermined times when said playing means plays the music data, based on the detection output from said sensor means;

determining means for determining whether the first difference, the first difference being between the tempo of music data being played by said playing means and the action tempo of the user detected by said second detecting means, is within the predetermined range;

second searching means for identifying, when said determining means determines that the first difference between the tempo of music data being played and the action tempo of the user is outside of the predetermined range, music data having a tempo of which a second difference as to the action tempo detected by said second detecting means is within the predetermined range; and changing means for changing the music data played by said playing means to the music data identified by said second searching means.

3. The audio player according to claim 1 or claim 2, further comprising:

history holding means for storing and holding at least identification information and play time of music data played through said playing means, as history information;

obtaining means for obtaining properties information of each music data played, based on the identification information of the music data held in said history holding means;

calculating means for calculating an exercise amount of the user, based on the profile information accepted through said means for receiving, said history information held in said history holding means, and the properties information obtained by said obtaining means; and output means for outputting information indicating the exercise amount calculated by said calculating means.

4. The audio player according to claim 1 or claim 2, further comprising:

exercise type detecting means for detecting an exercise type of the user, based on detection output from said sensor means, for each music data played;

history holding means for storing and holding history information correlating identification information and play time of the music data with said exercise type detected by said exercise type detecting means, for each music data played;

obtaining means for obtaining properties information of each music data played, based on the identification information of the music data held in said history holding means;

calculating means for calculating the exercise amount of the user, based on the profile information relating to the body of the user accepted through said means for receiving, said history information held in said history holding means, and the properties information obtained by said obtaining means; and output means for outputting information indicating the exercise amount calculated by said calculating means.

5. An audio playing method, implemented on an audio player, comprising:

a receiving process for receiving an input of profile information relating to physical characteristics of a user of the audio player;

a calculating process for calculating at least one additional physical characteristic of the user based on the input profile information prior to the user beginning exercising;

a displaying process for displaying the profile information input by the user and the at least one additional calculated physical characteristic of the user prior to the user beginning exercising;

a detecting process for detecting an action tempo of the user at a plurality of predetermined times following starting of playing of music data, based on a detection output from a sensor for detecting changes in actions of the user caused by the user exercising;

a determining process for determining whether a first difference, the first difference being between a tempo of music data being played and the action tempo of the user detected in said detecting process, is within a predetermined range;

a searching process for identifying, when said determining process determines that the first difference between the tempo of music data being played and the action tempo of the user is outside of the predetermined range, music data having a tempo of which a second difference as to the action tempo detected in said detecting process is within the predetermined range; and a changing process for changing the music data played to the music data identified in said searching process.

6. An audio playing method, implemented on an audio player, comprising:

a receiving process for receiving an input of profile information relating to physical characteristics of a user of the audio player;

a calculating process for calculating at least one additional physical characteristic of the user based on the input profile information prior to the user beginning exercising;

a displaying process for displaying the profile information input by the user and the at least one additional calculated physical characteristic of the user prior to the user beginning exercising;

a first detecting process for detecting an action tempo of the user before playing of music data, based on a detection output from a sensor for detecting changes in actions of the user caused by the user exercising;

a first searching process for identifying music data having a tempo of which a first difference as to the action tempo detected in said first detecting process is within a predetermined range;

a playing control process for controlling the music data identified by said first searching process to be played, a second detecting process for detecting an action tempo of the user at a plurality of predetermined times when the music data is being played, based on the detection output from the sensor for detecting changes in actions of the user;

a determining process for determining whether the first difference, the first difference being between the tempo of music data being played and the action tempo of the user detected in said second detecting process, is within the predetermined range;

a second searching process for identifying, when said determining process determines that the first difference between the tempo of music data being played and the action tempo of the user is outside of the predetermined range, music data having a tempo of which a second difference as to the action tempo detected by said second detecting process is within the predetermined range; and a changing process for changing the music data played to the music data identified in said second searching process.

7. The audio playing method according to claim 5 or claim 6, further comprising:

a history holding process for holding in storage means at least identification information and play time of music data played, as history information;

an obtaining process for obtaining properties information of each music data played, based on the identification information of the music data held in said storage means through said history holding process;

a calculating process for calculating the exercise amount of the user, based on the profile information relating to the body of the user accepted through said receiving process and exercise type indicating a type of exercise performed, said history information held in said storage means through said history holding process, and said properties information obtained in said obtaining process; and an output process for outputting information indicating the exercise amount calculated in said calculating process.

8. The audio playing method according to claim 5 or claim 6, further comprising:

an exercise type detecting process for detecting an exercise type of the user, based on detection output from a sensor for detecting change in actions of the user, for each music data played;

a history holding process for holding, in storage means, history information correlating identification information and play time of the music data with said exercise type detected in said exercise type detecting process, for each music data played;

an obtaining process for obtaining properties information of each music data played, based on the identification information of the music data held in said storage means through said history holding process;

a calculating process for calculating the exercise amount of the user, based on the profile information relating to the body of the user accepted through said receiving process, the history information held in said storage means through said history holding process, and the properties information obtained in said obtaining process; and an output process for outputting information indicating the exercise amount calculated in said calculating process.

9. A non-transitory computer readable storage medium having stored thereon an audio playing program which when executed by a processor included in an audio player for playing music data, causes the processor to execute a method comprising:

a receiving step for receiving an input of profile information relating to physical characteristics of a user of the audio player;

a calculating step for calculating at least one additional physical characteristic of the user based on the input profile information prior to the user beginning exercising;

a displaying step for displaying the profile information input by the user and the at least one additional calculated physical characteristic of the user prior to the user beginning exercising;

a detecting step for detecting an action tempo of the user at a plurality of predetermined times following starting of playing of music data, based on a detection output from a sensor for detecting changes in actions of the user caused by the user exercising;

a determining step for determining whether a first difference, the first difference being between a tempo of music data being played and the action tempo of the user detected in said detecting step, is within a predetermined range;

a searching step for identifying, when said determining step determines that the first difference between the tempo of music data being played and the action tempo of the user is outside of the predetermined range, music data having a tempo of which a second difference as to the action tempo detected in said detecting step is the predetermined range; and a changing step for changing the played music data to the music data identified in said searching step.

10. A non-transitory computer readable storage medium having stored thereon an audio playing program which when executed by a processor included in an audio player for playing music data, causes the processor to execute a method comprising:

a receiving step for receiving an input of profile information relating to physical characteristics of a user of the audio player;
a calculating step for calculating at least one additional physical characteristic of the user based on the input profile information prior to the user beginning exercising;
a displaying step for displaying the profile information input by the user and the at least one additional calculated physical characteristic of the user prior to the user beginning exercising;
a first detecting step for detecting an action tempo of the user before playing of music data, based on a detection output from a sensor for detecting changes in actions of the user caused by the user exercising;
a first searching step for identifying music data having a tempo of which a first difference as to the action tempo detected in said first detecting step is within a predetermined range;
a playing control step for controlling the music data identified by said first searching step to be played,
a second detecting step for detecting an action tempo of the user at a plurality of predetermined times when the music data is being played, based on a detection output from the sensor for detecting changes in actions of the user;
a determining step for determining whether the first difference, the first difference being between the tempo of music data being played and the action tempo of the user detected in said second detecting step, is within the predetermined range;
a second searching step for identifying, when said determining step determines that the first difference between the tempo of music data being played and the action tempo of the user is outside of the predetermined range, music data having a tempo of which a second difference as to the action tempo detected by said second detecting step is within the predetermined range; and
a changing step for changing the music data played to the music data identified in said second searching step.

11. The audio playing method according to claim 9 or claim 10, further comprising:
a history holding step for holding in storage means at least identification information and play time of music data played, as history information;
an obtaining step for obtaining properties information of each music data played, based on the identification information of the music data held in said storage means in said history holding step;
a calculating step for calculating the exercise amount of the user, based on the profile information relating to the body of the user accepted through said receiving step and exercise type indicating a type of exercise performed, said history information held in said storage means through said history holding step, and said properties information obtained in said obtaining step; and
an output step for outputting information indicating the exercise amount calculated in said calculating step.

12. The audio playing method according to claim 9 or claim 10, further comprising:
an exercise type detecting step for detecting an exercise type of the user, based on detection output from a sensor for detecting change in actions of the user, for each music data played;
a history holding step for holding, in storage means, history information correlating identification information and play time of the music data with said exercise type detected in said exercise type detecting step, for each music data played;
an obtaining step for obtaining properties information of each music data played, based on the identification information of the music data held in said storage means through said history holding step;
a calculating step for calculating the exercise amount of the user, based on the profile information relating to the body of the user accepted through said receiving step, said history information held in said storage means through said history holding step, and the properties information obtained in said obtaining step; and
an output step for outputting information indicating the exercise amount calculated in said calculating step.

13. An audio player comprising:
profile information accepting means for accepting input of personal profile information for a user relating to physical characteristics of a user of the audio player;
means for calculating at least one additional physical characteristic of the user based on the input personal profile information prior to the user beginning exercising;
means for displaying the profile information input by the user and the at least one additional calculated physical characteristic of the user prior to the user beginning exercising;
target exercise amount accepting means for accepting input of a target exercise amount of the user;
detecting means of detecting actions of the user caused by the user exercising;
calculating means for calculating an actual exercise amount of the user, based on the personal profile information of the user accepted through said profile information accepting means, and a detection output from said detecting means;
selecting means for automatically sequentially selecting music data to be played, during a period until an accumulated value of said actual exercise amount of the user calculated at said calculating means reaches said target exercise amount accepted through said target exercise amount accepting means; and
playing means for playing said music data selected by said selecting means.

14. The audio player according to claim 13, wherein said target exercise amount and said actual exercise amount include at least one of exercise time, exercise intensity, exercise distance, exercise number of times, number of steps, out-calories, and amount of fat burned.

15. The audio player according to claim 13, wherein said personal profile information includes at least one of name, height, weight, age, sex, and stride for each user.

16. The audio player according to claim 13, further comprising:
history information creating means for creating history information correlating at least identification information of played music data with actual exercise amount at a time of playing said music data;
storage means for storing and holding said history information created through said history information creating means; and
privilege providing means for providing a predetermined privilege when said actual exercise amount of said history information stored in said storage means reaches the target exercise amount.

17. An audio playing method comprising:
- a profile information accepting process for accepting input of personal profile information from a user relating to physical characteristics of a user of the audio player;
- a first calculating process for calculating at least one additional physical characteristic of the user prior to the user beginning exercising;
- a displaying process for displaying the profile information input by the user and the at least one additional calculated physical characteristic of the user prior to the user beginning exercising;
- a target exercise amount accepting process for accepting input of a target exercise amount of the user;
- a detecting process of detecting actions of the user caused by the user exercising;
- a second calculating process for calculating an actual exercise amount of the user, based on the personal profile information of the user accepted in said profile information accepting process, and a detection results detected in said detecting process;
- a selecting process for automatically sequentially selecting music data to be played, during a period until an accumulated value of said actual exercise amount of the user calculated in said second calculating process reaches said target exercise amount accepted in said target exercise amount accepting process; and
- a playing process for playing said music data selected in said selecting process.

18. The audio playing method according to claim 17, wherein said target exercise amount and said actual exercise amount include at least one of exercise time, exercise intensity, exercise distance, exercise number of times, number of steps, out-calories, and amount of fat burned.

19. The audio playing method according to claim 17, wherein said personal profile information includes at least one of name, height, weight, age, sex, and stride for each user.

20. The audio playing method according to claim 17, further comprising:
- a history information creating process for creating history information correlating at least identification information of played music data with actual exercise amount at a time of playing said music data;
- a storage processing process for storing and holding, in a recording medium, said history information created in said history information creating process; and
- a privilege providing process for providing a predetermined privilege when said actual exercise amount of said history information stored in said storage medium reaches the target exercise amount.

21. A non-transitory computer readable storage medium having stored thereon an audio playing program which when executed by a processor included in an audio player for playing music data, causes the processor to execute a method comprising:
- a profile information accepting step for accepting input of personal profile information from a user, input through a key operating unit relating to physical characteristics of a user of the audio player;
- a first calculating step for calculating at least one additional physical characteristic of the user based on the input personal profile information prior to the user beginning exercising;
- a displaying step for displaying the profile information input by the user and the at least one additional calculated physical characteristic of the user prior to the user beginning exercising;
- a target exercise amount accepting step for accepting input of a target exercise amount of the user, input through the key operating unit;
- a detecting step of detecting actions of the user, based on a detection output from a sensor device worn by the user caused by the user exercising;
- a second calculating step for calculating an actual exercise amount of the user, based on the personal profile information of the user accepted in said profile information accepting step, and the user actions detected in said detecting step;
- a selecting step for automatically sequentially selecting music data to be played, during a period until an accumulated value of said actual exercise amount of the user calculated in said second calculating step reaches said target exercise amount accepted in said target exercise amount accepting step; and
- a playing step for playing said music data selected in said selecting step.

22. The audio playing method according to claim 21, wherein said target exercise amount and said actual exercise amount include at least one of exercise time, exercise intensity, exercise distance, exercise number of times, number of steps, out-calories, and amount of fat burned.

23. The audio playing method according to claim 21, wherein said personal profile information includes at least one of name, height, weight, age, sex, and stride for each user.

24. The audio playing method according to claim 21, further comprising:
- a history information creating step for creating history information correlating at least identification information of played music data with actual exercise amount at a time of playing said music data;
- a storage processing step for storing and holding, in a recording medium, said history information created in said history information creating step; and
- a privilege providing step for providing a predetermined privilege when said actual exercise amount of said history information stored in said storage medium reaches the target exercise amount.

* * * * *